United States Patent

Larson et al.

Patent Number: 6,044,305
Date of Patent: Mar. 28, 2000

[54] METHOD AND APPARATUS FOR DEBUGGING AND TUNING A PROCESS CONTROL NETWORK HAVING DISTRIBUTED CONTROL FUNCTIONS

[75] Inventors: Brent H. Larson; Harry A. Burns; Larry K. Brown, all of Marshalltown, Iowa

[73] Assignee: Fisher Controls International, Inc., Clayton, Mo.

[21] Appl. No.: 08/983,020

[22] PCT Filed: Sep. 6, 1997

[86] PCT No.: PCT/US97/17343

§ 371 Date: Dec. 30, 1997

§ 102(e) Date: Dec. 30, 1997

[87] PCT Pub. No.: WO98/14851

PCT Pub. Date: Sep. 4, 1998

Related U.S. Application Data

[63] Continuation-in-part of application No. 08/726,263, Oct. 4, 1996, abandoned.

[51] Int. Cl.[7] .................................................. G05B 19/42
[52] U.S. Cl. ................................ 700/87; 700/2; 700/11; 700/52; 700/88; 709/102; 709/201; 710/260; 710/261
[58] Field of Search .................................... 700/87–89, 2, 700/4, 11, 13, 14, 17, 18, 19, 47–52; 709/100, 102, 103, 201; 710/260–264

[56] References Cited

U.S. PATENT DOCUMENTS

| | | | |
|---|---|---|---|
| 4,271,505 | 6/1981 | Menot et al. | 370/85 |
| 4,627,045 | 12/1986 | Olson et al. | 370/16 |

(List continued on next page.)

FOREIGN PATENT DOCUMENTS 0 450 116 A1  4/1990  European Pat. Off. .
0 449 458 A1  10/1991 European Pat. Off. .

(List continued on next page.)

OTHER PUBLICATIONS

Fieldbus Foundation Manual, Communications Technical Specification and User Layer Technical Specification, 1994–1997, including Fieldbus Message Specification FF–870–1.1; Physical Layer Conformance Testing FF–830 FS 1.0; Device Description Language FF–900–1.0; Function Blocks (Part 1) FF–890–1.2; Fieldbus Access Sublayer FF–875–1.1; Function Blocks (Part 2) FF–891–1.2; Data Link Protocol FF–822–1.1; System Management FF–880–1.1; Communication Profile FF–940–1.0; Transducer Blocks (Part 1) FF–902 Rev PA 2.0; Transducer Blocks (Part 2) FF–903–Rev PS 2.0; Data Link Services FF–821–1.0; 31.25 kbits/s Physical Layer Profile FF–816–1.0; Network Management FF–801–1.1; and System Architecture FF–800–1.0.

*Primary Examiner*—Paul P. Gordon
*Assistant Examiner*—Ramesh Patel
*Attorney, Agent, or Firm*—Marshall, O'Toole, Gerstein, Murray & Borun

[57] ABSTRACT

A system and method for debugging and tuning a process control network having distributed control functions implemented by a set of field devices communicatively linked over a bus includes an operational scheduler that schedules the execution of each of a number of process control functions and communication functions performed by the field devices to define a process control scheme and an indicator that indicates one or more process control scheme locations at which the process control scheme is to be automatically or conditionally interrupted to thereby enable debugging and/or tuning of the process control network. A controller interrupts execution of the process control scheme at the indicated flow locations, communicates process data to a user to display the current or a past state of the process to a user and waits for user input before continuing with operation of the process control scheme. In a tuning mode, the controller delivers data pertaining to a process parameter to a tuning device or to a user which determines a new tuning parameter, such as a gain, to be used within the process control scheme based on the process parameter data.

28 Claims, 9 Drawing Sheets

U.S. PATENT DOCUMENTS

| | | |
|---|---|---|
| 4,691,328 | 9/1987 | Sterling, Jr. et al. ...................... 375/36 |
| 4,831,558 | 5/1989 | Shoup et al. ............................. 364/550 |
| 4,918,690 | 4/1990 | Markkula, Jr. et al. .................. 370/94 |
| 4,955,305 | 9/1990 | Garnier et al. ...................... 112/121.11 |
| 4,974,625 | 12/1990 | Paullus et al. ............................ 137/85 |
| 4,976,144 | 12/1990 | Fitzgerald ................................. 73/168 |
| 5,014,185 | 5/1991 | Saito et al. ............................... 364/188 |
| 5,023,869 | 6/1991 | Grover et al. ............................. 370/84 |
| 5,109,692 | 5/1992 | Fitzgerald ................................. 73/168 |
| 5,148,433 | 9/1992 | Johnson et al. ........................ 371/11.3 |
| 5,193,189 | 3/1993 | Flood et al. ............................. 395/650 |
| 5,197,328 | 3/1993 | Fitzgerald ................................. 73/168 |
| 5,404,524 | 4/1995 | Celi, Jr. .................................. 395/700 |
| 5,434,774 | 7/1995 | Seberger et al. ........................ 365/172 |
| 5,439,021 | 8/1995 | Burlage et al. ............................ 137/84 |
| 5,451,923 | 9/1995 | Seberger et al. .................... 340/310.06 |
| 5,469,150 | 11/1995 | Sitte .................................. 340/825.07 |
| 5,469,548 | 11/1995 | Callison et al. ........................ 395/441 |
| 5,485,455 | 1/1996 | Dobbins et al. ........................... 370/60 |
| 5,530,643 | 6/1996 | Hodorowski ............................ 364/191 |
| 5,550,980 | 8/1996 | Pascucci et al. .................... 395/200.05 |
| 5,558,115 | 9/1996 | Lenz et al. ................................. 137/86 |
| 5,573,032 | 11/1996 | Lenz et al. ............................... 137/486 |
| 5,592,622 | 1/1997 | Isfeld et al. ........................ 395/200.02 |
| 5,631,825 | 5/1997 | van Weele et al. ..................... 364/188 |
| 5,650,777 | 7/1997 | Westfield et al. .................. 340/870.11 |
| 5,684,451 | 11/1997 | Seberger et al. .................... 340/310.06 |

FOREIGN PATENT DOCUMENTS

| | | |
|---|---|---|
| 0 546 339 A1 | 6/1993 | European Pat. Off. . |
| 0 562 333 A2 | 9/1993 | European Pat. Off. . |
| 0 575 150 A2 | 12/1993 | European Pat. Off. . |
| 0 604 091 A2 | 6/1994 | European Pat. Off. . |
| 195 10 466 A1 | 10/1996 | Germany . |
| WO 92/04676 | 3/1992 | WIPO . |
| WO 94/22776 | 10/1994 | WIPO . |
| WO 96/12993 | 5/1996 | WIPO . |

OTHER PUBLICATIONS

"FIELDVUE® ValveLink™ Series VL2000 Software," Fisher–Rosemount Bulletin 62.1: VL2000, pp. 1–6 (Nov. 1995).

"FIELDVUE® VL2000 Series Software User Guide," Fisher Controls, Version 2.0 (Jun. 1996).

"FIELDVUE® Digital Valve Controller Type DVC5000 Series," Fisher–Rosemount Bulletin 62.1:DVC5000, pp. 1–12 (Jun. 1994).

"FIELDVUE™ Digital Valve Controller DVC5000 Series Remotely Accessible Information," Fisher Controls Bulletin 62.1:DVC5000(S1), pp. 1–2 (Jun. 1994).

"FIELDVUE™ Digital Valve Controller Type DVC5000 Series," Fisher Controls Form 5335, pp. 1–35 and Errata Sheet (Jun. 1994).

Fisher–Rosemount Systems, "Fieldbus Technical Overview Understanding Foundation™ Fieldbus Technology," 27 pages, 1997.

"FOUNDATION™ Specification, Function Block Application Process," Part 3, 155 pages, 1995–1996.

Fieldbus Foundation™, "Technical Overview," FD–043 Revision 1.0, 29 pages, 1996.

Fromberger, "Feldbusfähige, intelligente Sensoren," Messen und Prpfen, vol. 27, No. 7, pp. 332, 334–340, 1991.

Watt, "The Double–Distributed Control Network," Thesis submitted to Thayer School of Engineering, Dartmouth College, Hanover, N.H. (Jan. 1984).

Zielinski et al., "Asset Management Using Fieldbus," Fisher–Rosemont Systems, Inc, pp. 1–14 (1997).

"Advanced Systems Simplify Control," Machine Design, vol. 68, No. 12, pp. 118, 120 (Jul. 11, 1996).

Black, "Combining Lan Technology with Smart Sensors to Provide Predictive Maintenance, Diagnostics and Alarm Systems," Proceedings of the Industrial Computing Conference, Chicago, vol. 3, Sep. 19, 1993, Industrial Computing Society/Instrument Society of America, pp. 345–354 (1993).

Zielinski, "Issues for Digital Field Instrument Networks," INTECH, pp. 92–94 (1989).

PCT International Search Report for PCT/US 97/17343 mailed Jan. 25, 1998.

Office Action mailed Oct. 6, 1997, issued in U.S. Patent Application Serial No. 08/726,263.

PCT Written Opinion issued in PCT application PCT/US97/17343 dated Jul. 9, 1998.

METHOD AND APPARATUS FOR DEBUGGING AND TUNING A PROCESS CONTROL NETWORK HAVING DISTRIBUTED CONTROL FUNCTIONS

RELATED APPLICATION

This is a continuation-in-part of U.S. patent application Ser. No. 08/726,263, now abandoned, filed Oct. 4, 1996.

FIELD OF THE INVENTION

The present invention relates generally to process control networks and, more specifically, to a method and apparatus for use in debugging and tuning a process control network having distributed control functions.

DESCRIPTION OF THE RELATED ART

Large processes such as chemical, petroleum and other manufacturing and refining processes include numerous field devices disposed at various locations to measure and control process parameters to thereby effect control of the process. These field devices may be, for example, sensors such as temperature, pressure, and flow rate sensors as well as control elements such as valves and switches. Historically, the process control industry used manual operations like manually reading level and pressure gauges, turning valve wheels, etc., to operate the measurement and control field devices within a process. Beginning in the 20th century, the process control industry began using local pneumatic control, in which local pneumatic controllers, transmitters, and valve positioners were placed at various locations within a process plant to effect control of certain plant elements. With the emergence of the microprocessor-based distributed control system (DCS) in the 1970's, distributed electronic process control became prevalent in the process control industry.

As is known, a DCS includes an analog or a digital computer, such as a programmable logic controller, connected to numerous electronic monitoring and control devices, such as electronic sensors, transmitters, current-to-pressure transducers, valve positioners, etc. located throughout a process. The DCS computer stores and implements a centralized and, frequently, complex control scheme to effect measurement and control of process parameters according to some overall control scheme. Usually, however, the control scheme implemented by a DCS is proprietary to the DCS manufacturer which, in turn, makes the DCS difficult and expensive to expand, upgrade, reprogram, and service because the DCS provider must become involved in an integral way to perform any of these activities. Furthermore, the equipment that can be used by or connected to any particular DCS may be limited due to the proprietary nature of DCS and the fact that a DCS provider may not support certain devices or functions of devices manufactured by other vendors.

To overcome some of the problems inherent in the use of proprietary DCSs, the process control industry has developed a number of standard, open communication protocols including, for example, the HART®, PROFIBUS®, WORLDFIP®, LONWORKS®, Device-Net®, and CAN protocols, which enable field devices made by different manufacturers to be used together within the same process control loop. In fact, any field device that conforms to one of these protocols can be used within a process to communicate with and to be controlled by a DCS or other controller that supports the protocol, even if that field device is made by a different manufacturer than the DCS controller manufacturer.

Moreover, there is now a move within the process control industry to decentralize process control and, thereby, simplify DCS controllers or eliminate the need for DCS controllers to a large extent. Decentralized control is obtained by having process control devices, such as valve positioners, transmitters, etc. perform one or more process control functions and by then communicating data across a bus structure for use by other process control devices. To implement control functions, each process control device includes a microprocessor having the capability to perform one or more basic control functions as well as the ability to communicate with other process control devices using a standard and open communication protocol. In this manner, field devices made by different manufacturers can be interconnected within a process control loop to communicate with one another and to perform one or more process control functions or control loops without the intervention of a DCS. The all digital, two-wire loop protocol now being promulgated by the Fieldbus Foundation, known as the FOUNDATION™ Fieldbus protocol (hereinafter the "Fieldbus protocol") is one open communication protocol that allows devices made by different manufacturers to interoperate and communicate with one another via a standard bus to effect decentralized control within a process.

As noted above, the decentralization of process control functions simplifies and, in some cases, eliminates the necessity of a proprietary DCS which, in turn, reduces the need of a process operator to rely on the DCS manufacturer to implement, change or upgrade a control scheme for a process control network. In fact, locating basic process control functions within field devices interconnected by a standard communication bus allows a process to be reconfigured, upgraded, enlarged or otherwise changed by reconfiguring the manner in which the field devices communicate with one another. Such communication reconfiguration is relatively simple, however, because all of the devices performing control functions conform to an open communication standard. As a result, reconfiguration of such a control scheme does not involve or use proprietary information of any particular manufacturer or require the reprogramming of any device in a proprietary manner. Furthermore, decentralized control reduces the number of or the length of the wires needed within a process environment because each of the process control devices does not need to be connected directly to a DCS or other controller but, instead, all of the devices can be connected together using a bus-type architecture. Also, decentralized control results in an increase in the overall control speed of a process because of the shorter distances that each communication signal must travel and because data flow bottlenecks which typically occur at a DCS controller are reduced.

While decentralized control makes a process control network easier to reconfigure, it also makes the procedure of debugging and tuning a process control network at, for example, the start-up of the network, much more difficult, precisely because the different control functions are implemented at different times by different devices distributed throughout the process control network. In fact, a process control network having distributed control functions, such as a Fieldbus network, includes many control elements and functional devices that interact in a highly complex manner using synchronous communications over a bus and, thus, the interactions between the various control elements and functional devices are difficult to model and may not be fully appreciated by an operator that was not integrally involved in the design of the process control system. Of course, the greatest complexity and operating difficulty is raised when a process control network is first initialized or is "brought on line." This initialization process commonly requires great skill because a process control network that becomes unstable can be highly dangerous, particularly in oil and gas pipeline applications, nuclear power generating stations, chemical processing applications and the like. Furthermore, once the process control system is operational, tuning or retuning of the system may be necessary.

Because a process control network having distributed control functions does not include a centralized controller that stores an overall control algorithm that can be programmed to step through each of the different operations or to stop at predetermined times to allow debugging and tuning of the process control scheme, it is difficult to debug these systems when they are being brought on-line and is can be difficult to retune these systems. In fact, because the different functions of the overall control scheme are performed at different places within the process control network and these different control functions are scheduled to implement at predetermined times, based on synchronous communications occurring over a bus, there is no mechanism for stopping the control scheme at various points to view variable values, etc., to step through the control scheme one operation at a time or to retune the control scheme, all of which are advantageous when implementing a new control scheme or when debugging or retuning a process control scheme.

SUMMARY OF THE INVENTION

The present invention is directed to a method of and an apparatus for debugging and tuning a process control network having distributed control functions. In accordance with one aspect of the present invention, during the initialization and tuning of a process control network having distributed control functions, a method stops a process loop during execution and preserves process control information for display to a user. Thereafter, when directed by the user, the method continues execution of the process control network to isolate system errors or "bugs." The method may also monitor and save control function parameters in real-time at loop execution speeds to provide a "trace" function which is useful in tuning or retuning the process control network.

In accordance with another aspect of the present invention, a method and apparatus receives requests to tune selected process control parameters, adjusts the parameters over a bus, and monitors input and output parameters of control functions within a process control loop in real-time to enable an operator to determine whether a process control loop having distributed control functions is tuned properly.

In accordance with a still further aspect of the present invention, a process control loop operating in a two-wire, two-way digital communication environment includes control logic for accessing a process control variable in real-time during execution of the process control loop and a memory that stores the variable. The process control variable may be available locally to a device within the process control loop or peripherally to a host device connected or coupled to the process control loop. In one embodiment, the process control loop may include a routine that defines one or more breakpoints and that directs the control loop to execute to the breakpoint, at which a specified event, condition or a program code execution address occurs The process control loop may also include a routine that is operative at the occurrence of a breakpoint or at some other flow-control location, to single-step through subsequent functional blocks of the process control scheme.

Breakpoints may be implemented both between control functions and inside of control functions stored in the process control devices within a process control loop. For example, one breakpoint may be set after data is latched into a field device over a bus and a second breakpoint may be set after the field device executes a control function. In another example, a first breakpoint is set after a control algorithm is executed but before data is transferred to another control function, which may be in the same or a different process control device, while a second breakpoint is set after data is transmitted from one device to another but before an algorithm associated with the next process control function begins to execute.

With the method and apparatus of the present invention, diagnostic test time is substantially reduced due to the ability to single-step through a process control scheme in a process control network having distributed control functions or to have such a process control scheme stop at predetermined breakpoints.

DESCRIPTION OF THE PREFERRED EMBODIMENTS

Figure 1:
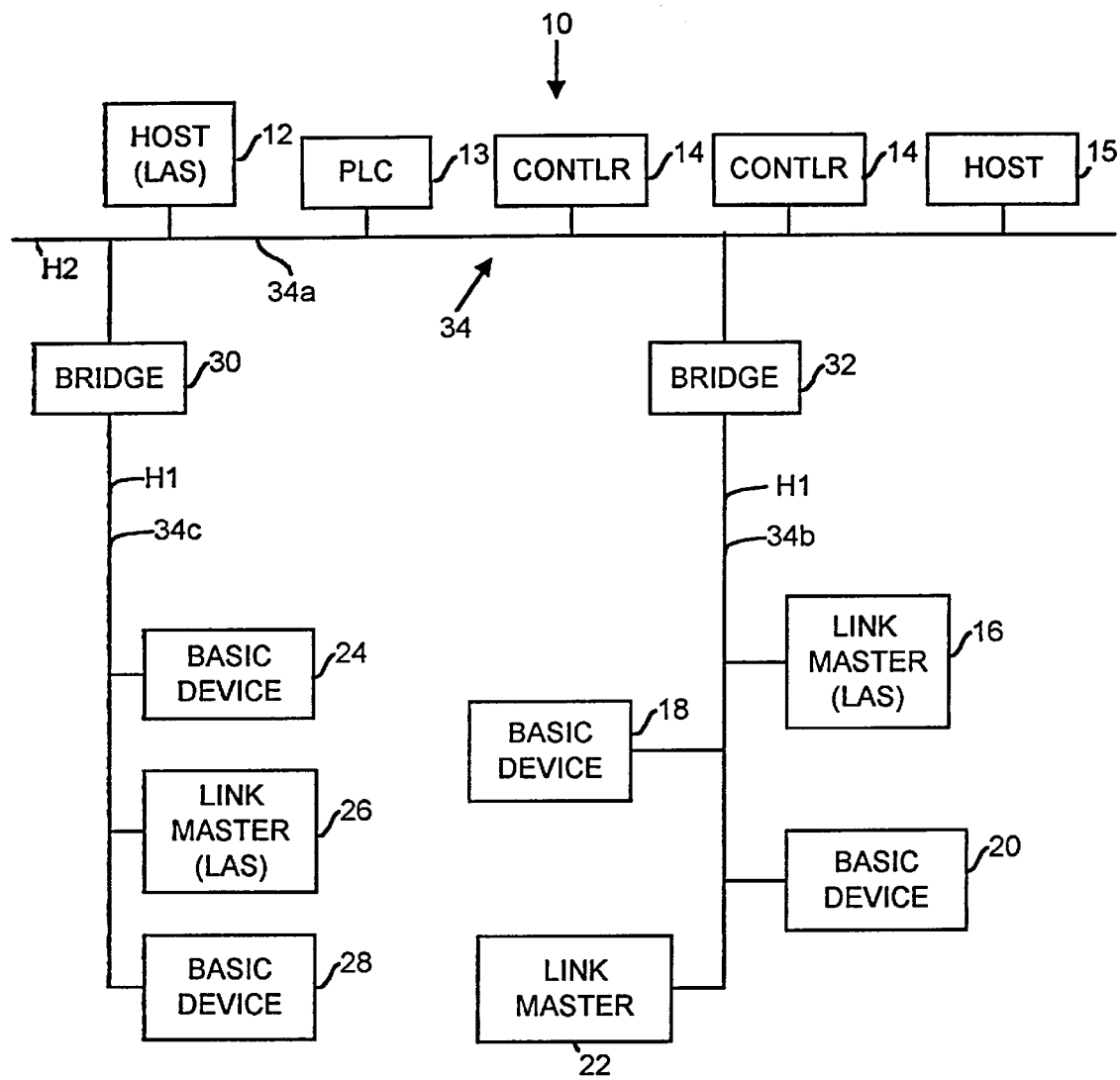
FIG. 1 is a schematic block diagram of an example process control network using the Fieldbus protocol.

While the method and apparatus for debugging and tuning a process control network of the present invention are described in detail in conjunction with a process control network that implements process control functions in a decentralized or distributed manner using a set of Fieldbus devices, it should be noted that the debugging and tuning method and apparatus of the present invention can be used with process control networks that perform distributed control functions using other types of field devices and communication protocols, including protocols that rely on other than two-wire buses and protocols that support only analog or both analog and digital communications. Thus, for example, the debugging and tuning method and apparatus of the present invention can be used in any process control network that performs distributed control functions even if this process control network uses the HART, PROFIBUS, etc. communication protocols or any other communication protocols that now exist or that may be developed in the future.

Before discussing the details of the debugging and tuning method and apparatus of the present invention, a general description of the Fieldbus protocol, field devices configured according to this protocol, and the way in which communication occurs in a process control network that uses the Fieldbus protocol will be provided. However, it should be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Texas. In particular, the Fieldbus protocol, and the manner of communicating with and storing data in devices using the Fieldbus protocol, is described in detail in the manuals known as Communication Technical Specification and User Layer Technical Specification from the Fieldbus Foundation, which are hereby incorporated by reference in their entirety herein.

The Fieldbus protocol is an all-digital, serial, two-way communication protocol that provides a standardized physical interface to a two-wire loop or bus interconnecting "field" equipment such as sensors, actuators, controllers, valves, etc. located in an instrumentation or process control environment of, for example, a factory or a plant. The Fieldbus protocol provides, in effect, a local area network for field instruments (field devices) within a process facility, which enables these field devices to perform control functions at locations distributed throughout a process and to communicate with one another before and after the performance of these control functions to implement an overall control strategy. Because the Fieldbus protocol enables control functions to be distributed throughout a process control network, it reduces the complexity of, or entirely eliminates the necessity of the centralized process controller typically associated with a DCS.

Referring to FIG. 1, a process control network 10 using the Fieldbus protocol may include a host 12 connected to a number of other devices such as a program logic controller (PLC) 13, a number of controllers 14, another host device 15 and a set of field devices 16, 18, 20, 22, 24, 26, 28, 30, and 32 via a two-wire Fieldbus loop or bus 34. The bus 34 includes different sections or segments, 34a, 34b, and 34c which are separated by bridge devices 30 and 32. Each of the sections 34a, 34b, and 34c interconnects a subset of the devices attached to the bus 34 to enable communications between the devices in a manner described hereinafter. Of course, the network of FIG. 1 is illustrative only, there being many other ways in which a process control network may be configured using the Fieldbus protocol. Typically, a configurer is located in one of the devices, such as the host 12, and is responsible for setting up or configuring each of the devices (which are "smart" devices in that they each include a microprocessor capable of performing communication and, in some cases, control functions) as well as recognizing when new field devices are connected to the bus 34, when field devices are removed from the bus 34, receiving data generated by the field devices 16–32, and interfacing with one or more user terminals, which may be located in the host 12 or in any other device connected to the host 12 in any manner.

The bus 34 supports or allows two-way, purely digital communication and may also provide a power signal to any or all of the devices connected thereto, such as the field devices 16–32. Alternatively, any or all of the devices 12–32 may have their own power supplies or may be connected to external power supplies via separate wires (not shown). While the devices 12–32 are illustrated in FIG. 1 as being connected to the bus 34 in a standard bus-type connection, in which multiple devices are connected to the same pair of wires making up the bus segments 34a, 34b, and 34c, the Fieldbus protocol allows other device/wire topologies including point-to-point connections, in which each device is connected to a controller or a host via a separate two-wire pair (similar to typical 4–20 mA analog DCS systems), and tree or "spur" connections in which each device is connected to a common point in a two-wire bus which may be, for example, a junction box or a termination area in one of the field devices within a process control network.

Data may be sent over the different bus segments 34a, 34b, and 34c at the same or different communication baud rates or speeds according to the Fieldbus protocol. For example, the Fieldbus protocol provides a 31.25 Kbit/s communication rate (H1), illustrated as being used by the bus segments 34b and 34c of FIG. 1, and a 1.0 Mbit/s and/or a 2.5 Mbit/s (H2) communication rate, which will be typically used for advanced process control, remote input/output, and high speed factory automation applications and is illustrated as being used by the bus segment 34a of FIG. 1. Likewise, data may be sent over the bus segments 34a, 34b, and 34c according to the Fieldbus protocol using voltage mode signaling or current mode signaling. Of course, the maximum length of each segment of the bus 34 is not strictly limited but is, instead, determined by the communication rate, cable type, wire size, bus power option, etc. of that section.

The Fieldbus protocol classifies the devices that can be connected to the bus 34 into three categories, namely, basic devices, link master devices, and bridge devices. Basic devices (such as devices 18, 20, 24, and 28 of FIG. 1) can communicate, that is, send and receive communication signals on or from the bus 34, but are not capable of controlling the order or timing of communication that occurs on the bus 34. Link master devices (such as devices 16, 22, and 26 as well as the host 12 of FIG. 1) are devices that communicate over the bus 34 and are capable of controlling the flow of and the timing of communication signals on the bus 34. Bridge devices (such as devices 30 and 32 of FIG. 1) are devices configured to communicate on and to interconnect individual segments or branches of a Fieldbus bus to create larger process control networks. If desired, bridge devices may convert between different data speeds and/or different data signaling formats used on the different segments of the bus 34, may amplify signals traveling between the segments of the bus 34, may filter the signals flowing between the different segments of the bus 34 and pass only those signals destined to be received by a device on one of the bus segments to which the bridge is coupled and/or may take other actions necessary to link different segments of the bus 34. Bridge devices that connect bus segments that operate at different speeds must have link master capabilities at the lower speed segment side of the bridge. The hosts 12 and 15, the PLC 13, and the controllers 14 may be any type of fieldbus device but, typically, will be link master devices.

Each of the devices 12–32 is capable of communicating over the bus 34 and, importantly, is capable of independently performing one or more process control functions using data acquired by the device, from the process, or from a different device via communication signals on the bus 34. Fieldbus devices are, therefore, capable of directly implementing portions of an overall control strategy which, in the past, were performed by a centralized digital controller of a DCS. To perform control functions, each Fieldbus device includes one or more standardized "blocks" which are implemented in a microprocessor within the device. In particular, each Fieldbus device includes one resource block, zero or more function blocks, and zero or more transducer blocks. These blocks are referred to as block objects.

A resource block stores and communicates device specific data pertaining to some of the characteristics of a Fieldbus device including, for example, a device type, a device revision indication, and indications of where other device specific information may be obtained within a memory of the device. While different device manufacturers may store different types of data in the resource block of a field device, each field device conforming to the Fieldbus protocol includes a resource block that stores some data.

A function block defines and implements an input function, an output function, or a control function associated with the field device and, thus, function blocks are generally referred to as input, output, and control function blocks. However, other categories of function blocks such as hybrid function blocks may exist or may be developed in the future. Each input or output function block produces at least one process control input (such as a process variable from a process measurement device) or process control output (such as a valve position sent to an actuation device) while each control function block uses an algorithm (which may be proprietary in nature) to produce one or more process outputs from one or more process inputs and control inputs. Examples of standard function blocks include analog input (AI), analog output (AO), bias (B), control selector (CS), discrete input (DI), discrete output (DO), manual loader (ML), proportional/derivative (PD), proportional/integral/derivative (PID), ratio (RA), and signal selector (SS) function blocks. However, other types of function blocks exist and new types of function blocks may be defined or created to operate in the Fieldbus environment.

A transducer block couples the inputs and outputs of a function block to local hardware devices, such as sensors and device actuators, to enable function blocks to read the outputs of local sensors and to command local devices to perform one or more functions such as moving a valve member. Transducer blocks typically contain information that is necessary to interpret signals delivered by a local device and to properly control local hardware devices including, for example, information identifying the type of a local device, calibration information associated with a local device, etc. A single transducer block is typically associated with each input or output function block.

Most function blocks are capable of generating alarm or event indications based on predetermined criteria and are capable of operating differently in different modes. Generally speaking, function blocks may operate in an automatic mode, in which, for example, the algorithm of a function block operates automatically; an operator mode in which the input or output of, for example, a function block, is controlled manually; an out-of-service mode in which the block does not operate; a cascade mode in which the operation of the block is affected from (determined by) the output of a different block; and one or more remote modes in which a remote computer determines the mode of the block. However, other modes of operation exist in the Fieldbus protocol.

Importantly, each block is capable of communicating with other blocks in the same or different field devices over the Fieldbus bus 34 using standard message formats defined by the Fieldbus protocol. As a result, combinations of function blocks (in the same or different devices) may communicate with each other to produce one or more decentralized control loops. Thus, for example, a PID function block in one field device may be connected via the bus 34 to receive an output of an AI function block in a second field device, to deliver data to an AO function block in third field device, and to receive an output of the AO function block as feedback to create a process control loop separate and apart from any DCS controller. In this manner, combinations of function blocks move control functions out of a centralized DCS environment, which allows DCS multi-function controllers to perform supervisory or coordinating functions or to be eliminated altogether. Furthermore, function blocks provide a graphical, block-oriented structure for easy configuration of a process and enable the distribution of functions among field devices from different suppliers because these blocks use a consistent communication protocol.

In addition to containing and implementing block objects, each field device includes one or more other objects including link objects, trend objects, alert objects, and view objects. Link objects define the links between the inputs and outputs of blocks (such as function blocks) both internal to the field device and across the Fieldbus bus 34.

Trend objects allow local trending of function block parameters for access by other devices such as the host 12 or controllers 14 of FIG. 1. Trend objects retain short-term historical data pertaining to some, for example, function block parameter and report this data to other devices or function blocks via the bus 34 in an asynchronous manner. Alert objects report alarms and events over the bus 34. These alarms or events may relate to any event that occurs within a device or one of the blocks of a device. View objects are predefined groupings of block parameters used in standard human/machine interfacing and may be sent to other devices for viewing from time to time.

Figure 2:
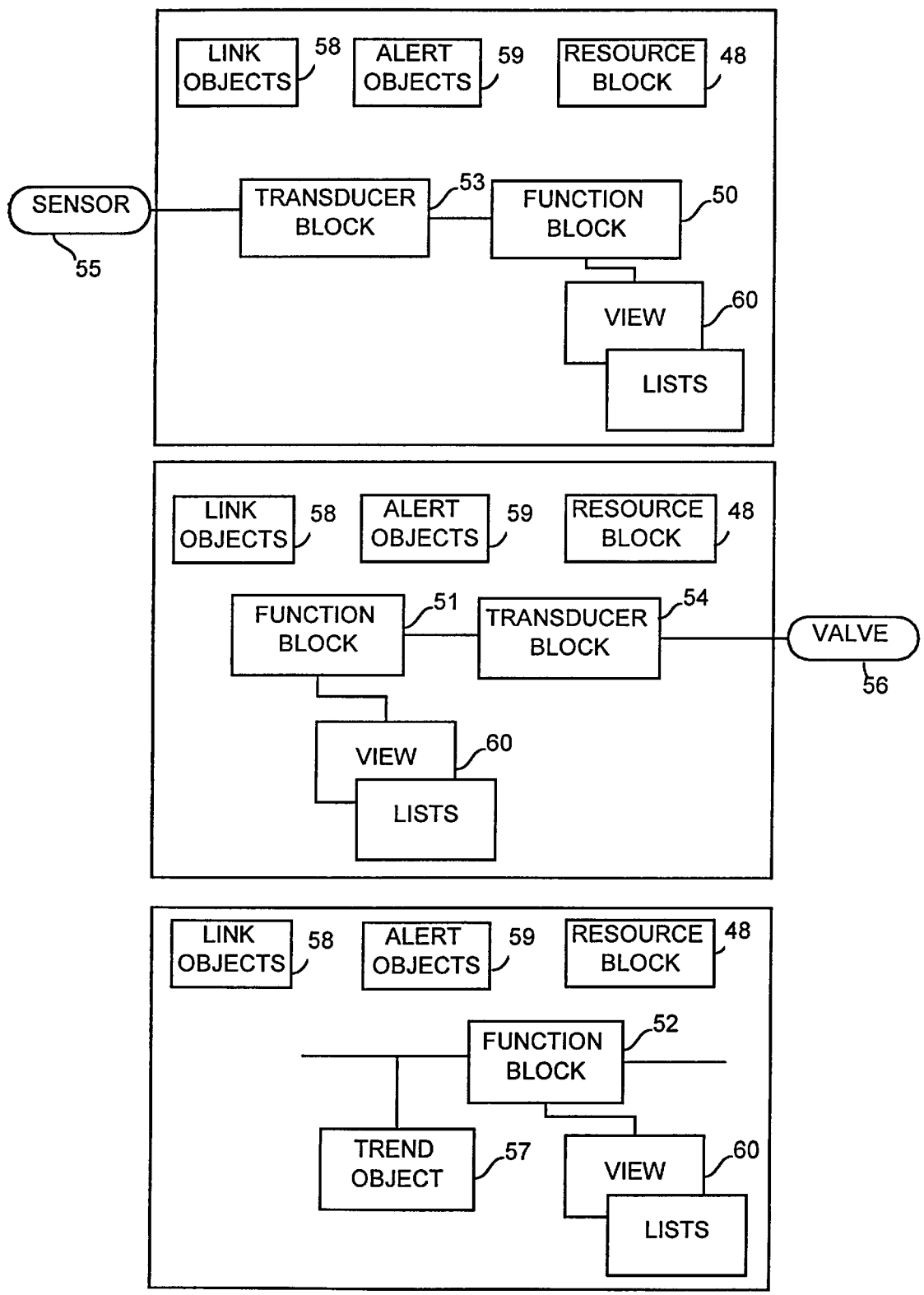
FIG. 2 is a schematic block diagram of Fieldbus devices having a set of three function blocks therein.

Referring now to FIG. 2, three Fieldbus devices, which may be, for example, any of the field devices 16–28 of FIG. 1, are illustrated as including resource blocks 48, function blocks 50, 51, or 52 and transducer blocks 53 and 54. In the first device, the function block 50 (which may be an input function block) is coupled through the transducer block 53 to a sensor 55, which may be, for example, a temperature sensor, a set point indication sensor, etc. In the second device, the function block 51 (which may be an output function block) is coupled through the transducer block 54 to an output device such as a valve 56. In the third device, function block 52 (which may be a control function block) has a trend object 57 associated therewith for trending the input parameter of the function block 52.

Link objects 58 define the block parameters of each of the associated blocks and alert objects 59 provide alarms or event notifications for the each of the associated blocks. View objects 60 are associated with each of the function blocks 50, 51, and 52 and include or group data lists for the function blocks with which they are associated. These lists contain information necessary for each of a set of different defined views. Of course, the devices of FIG. 2 are merely exemplary and other numbers of and types of block objects, link objects, alert objects, trend objects, and view objects may be provided in any field device.

Figure 3:
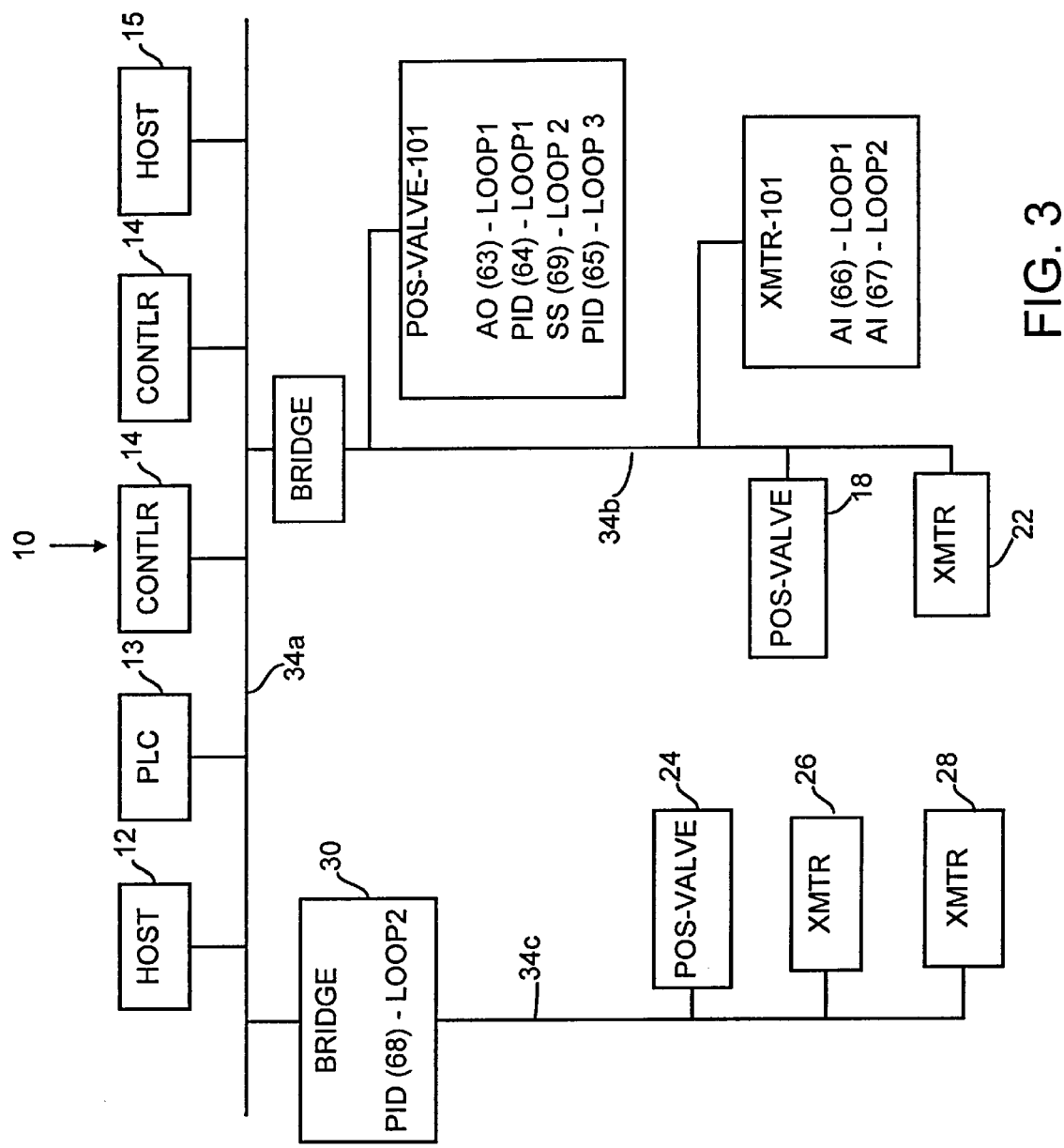
FIG. 3 is a schematic block diagram illustrating the function blocks within some of the devices of the process control network of FIG. 1.

Referring now to FIG. 3, a block diagram of the process control network 10 depicting the devices 16, 18, and 24 as positioner/valve devices and the devices 20, 22, 26, and 28 as transmitters also illustrates the function blocks associated with the positioner/valve 16, the transmitter 20, and the bridge 30. As illustrated in FIG. 3, the positioner/valve 16 includes a resource (RSC) block 61, a transducer (XDCR) block 62, and a number of function blocks including an analog output (AO) function block 63, two PID function blocks 64 and 65, and a signal select (SS) function block 69. The transmitter 20 includes a resource block 61, two transducer blocks 62, and two analog input (AI) function blocks 66 and 67. Also, the bridge 30 includes a resource block 61 and a PID function block 68.

As will be understood, the different function blocks of FIG. 3 may operate together (by communicating over the bus 34) in a number of control loops and the control loops in which the function blocks of the positioner/valve 16, the transmitter 20, and the bridge 30 are located are identified in FIG. 3 by a loop identification block connected to each of these function blocks. Thus, as illustrated in FIG. 3, the AO function block 63 and the PID function block 64 of the positioner/valve 16 and the AI function block 66 of the transmitter 20 are connected within a control loop indicated as LOOP1, while the SS function block 69 of the positioner/valve 16, the AI function block 67 of the transmitter 20, and the PID function block 68 of the bridge 30 are connected in a control loop indicated as LOOP2. The other PID function block 65 of the positioner/valve 16 is connected within a control loop indicated as LOOP3.

Figure 4:
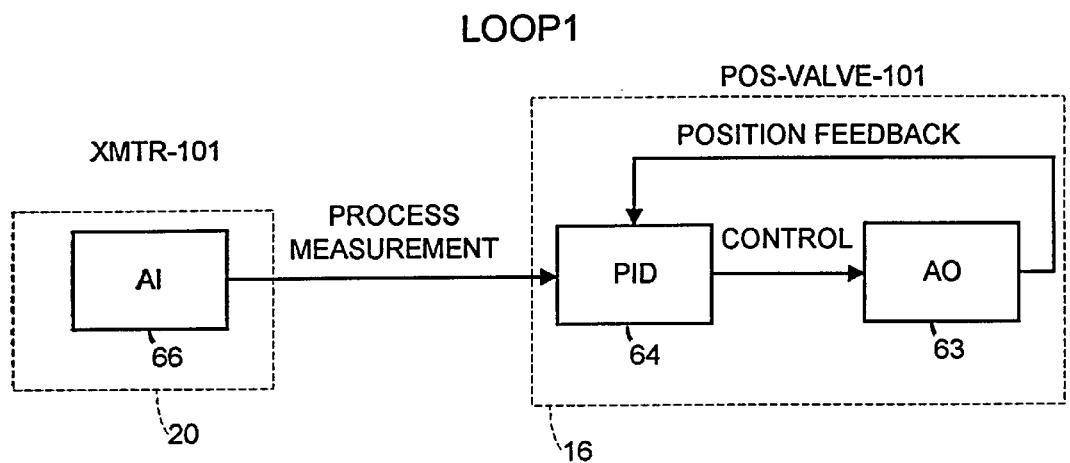
FIG. 4 is a control loop schematic for a process control loop within the process control network of FIG. 1.

The interconnected function blocks making up the control loop indicated as LOOP1 in FIG. 3 are illustrated in more detail in the schematic of this control loop depicted in FIG. 4. As can be seen from FIG. 4, the control loop LOOP1 is completely formed by communication links between the AO function block 63 and the PID function block 64 of the positioner/valve 16 and the AI function block 66 of the transmitter 20 (FIG. 3). The control loop diagram of FIG. 4 illustrates the communication interconnections between these function blocks using lines attaching the process and control inputs and outputs of these functions blocks. Thus, the output of the AI function block 66, which may comprise a process measurement or process parameter signal, is communicatively coupled via the bus segment 34b to the input of the PID function block 64 which has an output comprising a control signal communicatively coupled to an input of the AO function block 63. An output of the AO function block 63, which comprises a feedback signal indicating, for example, the position of the valve 16, is connected to a control input of the PID function block 64. The PID function block 64 uses this feedback signal along with the process measurement signal from the AI function block 66 to implement proper control of the AO function block 63. Of course the connections indicated by the lines in the control loop diagram of FIG. 4 may be performed internally within a field device when, as with the case of the AO and the PID function blocks 63 and 64, the function blocks are within the same field device (e.g., the positioner/valve 16), or these connections may be implemented over the two-wire communication bus 34 using standard Fieldbus synchronous communications. Of course, other control loops are implemented by other function blocks that are communicatively interconnected in other configurations.

To implement and perform communication and control activities, the Fieldbus protocol uses three general categories of technology identified as a physical layer, a communication "stack," and a user layer. The user layer includes the control and configuration functions provided in the form of blocks (such as function blocks) and objects within any particular process control device or field device. The user layer is typically designed in a proprietary manner by the device manufacturer but must be capable of receiving and sending messages according to the standard message format defined by the Fieldbus protocol and of being configured by a user in standard manners. The physical layer and the communication stack are necessary to effect communication between different blocks of different field devices in a standardized manner using the two-wire bus 34 and may be modeled by the well-known Open Systems Interconnect (OSI) layered communication model.

The physical layer, which corresponds to OSI layer 1, is embedded in each field device and the bus 34 and operates to convert electromagnetic signals received from the Fieldbus transmission medium (the two-wire bus 34) into messages capable of being used by the communication stack of the field device. The physical layer may be thought of as the bus 34 and the electromagnetic signals present on the bus 34 at the inputs and outputs of the field devices.

The communication stack, which is present in each Fieldbus device, includes a data link layer, which corresponds to OSI layer 2, a Fieldbus access sublayer, and a Fieldbus message specification layer, which corresponds to OSI layer 6. There is no corresponding structure for OSI layers 3–5 in the Fieldbus protocol. However, the applications of a fieldbus device comprise a layer 7 while a user layer is a layer 8, not defined in the OSI protocol. Each layer in the communication stack is responsible for encoding or decoding a portion of the message or signal that is transmitted on the Fieldbus bus 34. As a result, each layer of the communication stack adds or removes certain portions of the Fieldbus signal such as preambles, start delimiters, and end delimiters and, in some cases, decodes the stripped portions of the Fieldbus signal to identify where the rest of the signal or message should be sent or if the signal should be discarded because, for example, it contains a message or data for function blocks that are not within the receiving field device.

The data link layer controls transmission of messages onto the bus 34 and manages access to the bus 34 according to a deterministic centralized bus scheduler called a link active scheduler, to be described in more detail below. The data link layer removes a preamble from the signals on the transmission medium and may use the received preamble to synchronize the internal clock of the field device with the incoming Fieldbus signal. Likewise, the data link layer converts messages on the communication stack into physical Fieldbus signals and encodes these signals with clock information to produce a "synchronous serial" signal having a proper preamble for transmission on the two-wire bus 34. During the decoding process, the data link layer recognizes special codes within the preamble, such as start delimiters and end delimiters, to identify the beginning and the end of a particular Fieldbus message and may perform a checksum to verify the integrity of the signal or message received from the bus 34. Likewise, the data link layer transmits Fieldbus signals on the bus 34 by adding start and end delimiters to messages on the communication stack and placing these signals on the transmission medium at the appropriate time.

The Fieldbus message specification layer allows the user layer (i.e., the function blocks, objects, etc. of a field device) to communicate across the bus 34 using a standard set of message formats and describes the communication services, message formats, and protocol behaviors required to build messages to be placed onto the communication stack and to be provided to the user layer. Because the Fieldbus message specification layer supplies standardized communications for the user layer, specific Fieldbus message specification communication services are defined for each type of object described above. For example, the Fieldbus message specification layer includes object dictionary services which allows a user to read an object dictionary of a device. The object dictionary stores object descriptions that describe or identify each of the objects (such as block objects) of a device. The Fieldbus message specification layer also provides context management services which allows a user to read and change communication relationships, known as virtual communication relationships (VCRs) described hereinafter, associated with one or more objects of a device. Still further, the Fieldbus message specification layer provides variable access services, event services, upload and download services, and program invocation services, all of which are well known in the Fieldbus protocol and, therefore, will not be described in more detail herein. The Fieldbus access sublayer maps the Fieldbus message specification layer into the data link layer.

To allow or enable operation of these layers, each Fieldbus device includes a management information base (MIB), which is a database that stores VCRs, dynamic variables, statistics, link active scheduler timing schedules, function block execution timing schedules and device tag and address information. Of course, the information within the MIB may be accessed or changed at any time using standard Fieldbus messages or commands. Furthermore, a device description is usually provided with each device to give a user or a host an extended view of the information in the VFD. A device description, which must typically be tokenized to be used by a host, stores information needed for the host to understand the meaning of the data in the VFDs of a device.

As will be understood, to implement any control strategy using function blocks distributed throughout a process control network, the execution of the function blocks must be precisely scheduled with respect to the execution of other function blocks in a particular control loop. Likewise, communication between different function blocks must be precisely scheduled on the bus 34 so that the proper data is provided to each function block before that block executes.

The way in which different field devices (and different blocks within field devices) communicate over the Fieldbus transmission medium will now be described with respect to FIG. 1. For communication to occur, one of the link master devices on each segment of the bus 34 (for example, devices 12, 16, and 26) operates as a link active scheduler (LAS) which actively schedules and controls communication on the associated segment of the bus 34. The LAS for each segment of the bus 34 stores and updates a communication schedule (a link active schedule) containing the times that each function block of each device is scheduled to start periodic communication activity on the bus 34 and the length of time for which this communication activity is to occur. While there may be one and only one active LAS device on each segment of the bus 34, other link master devices (such as the device 22 on the segment 34b) may serve as backup LASs and become active when, for example, the current LAS fails. Basic devices do not have the capability to become an LAS at any time.

Generally speaking, communication activities over the bus 34 are divided into repeating macrocycles, each of which includes one synchronous communication for each function block active on any particular segment of the bus 34 and one or more asynchronous communications for one or more of the functions blocks or devices active on a segment of the bus 34. A device may be active, i.e., send data to and receive data from any segment of the bus 34, even if it is physically connected to a different segment of the bus 34, through coordinated operation of the bridges and the LASs on the bus 34.

During each macrocycle, each of the function blocks active on a particular segment of the bus 34 executes, usually at a different, but precisely scheduled (synchronous) time and, at another precisely scheduled time, publishes its output data on that segment of the bus 34 in response to a compel data command generated by the appropriate LAS. Preferably, each function block is scheduled to publish its output data shortly after the end of the execution period of the function block. Furthermore, the data publishing times of the different function blocks are scheduled serially so that no two function blocks on a particular segment of the bus 34 publish data at the same time. During the time that synchronous communication is not occurring, each field device is allowed, in turn, to transmit alarm data, view data, etc. in an asynchronous manner using token driven communications. The execution times and the amount of time necessary to complete execution of each function block are stored in the management information base (MIB) of the device in which the function block resides while, as noted above, the times for sending the compel data commands to each of the devices on a segment of the bus 34 are stored in the MIB of the LAS device for that segment. These times are typically stored as offset times because they identify the times at which a function block is to execute or send data as an offset from the beginning of an "absolute link schedule start time," which is known by all of the devices connected to the bus 34.

To effect communications during each macrocycle, the LAS, for example, the LAS 16 of the bus segment 34b, sends a compel data command to each of the devices on the bus segment 34b according to the list of transmit times stored in the link active schedule. Upon receiving a compel data command, a function block of a device publishes its output data on the bus 34 for a specific amount of time. Because each of the functions blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block and indicates that the published data is old data using a time-stamp.

After the LAS has sent a compel data command to each of the function blocks on particular segment of the bus 34 and during the times that function blocks are executing, the LAS may cause asynchronous communication activities to occur. To effect asynchronous communication, the LAS sends a pass token message to a particular field device. When a field device receives a pass token message, that field device has full access to the bus 34 (or a segment thereof) and can send asynchronous messages, such as alarm messages, trend data, operator set point changes, etc. until the messages are complete or until a maximum allotted "token hold time" has expired. Thereafter the field device releases the bus 34 (or any particular segment thereof) and the LAS sends a pass token message to another device This process repeats until the end of the macrocycle or until the LAS is scheduled to send a compel data command to effect synchronous communication. Of course, depending on the amount of message traffic and the number of devices and blocks coupled to any particular segment of the bus 34, not every device may receive a pass token message during each macrocycle.

Figure 5:
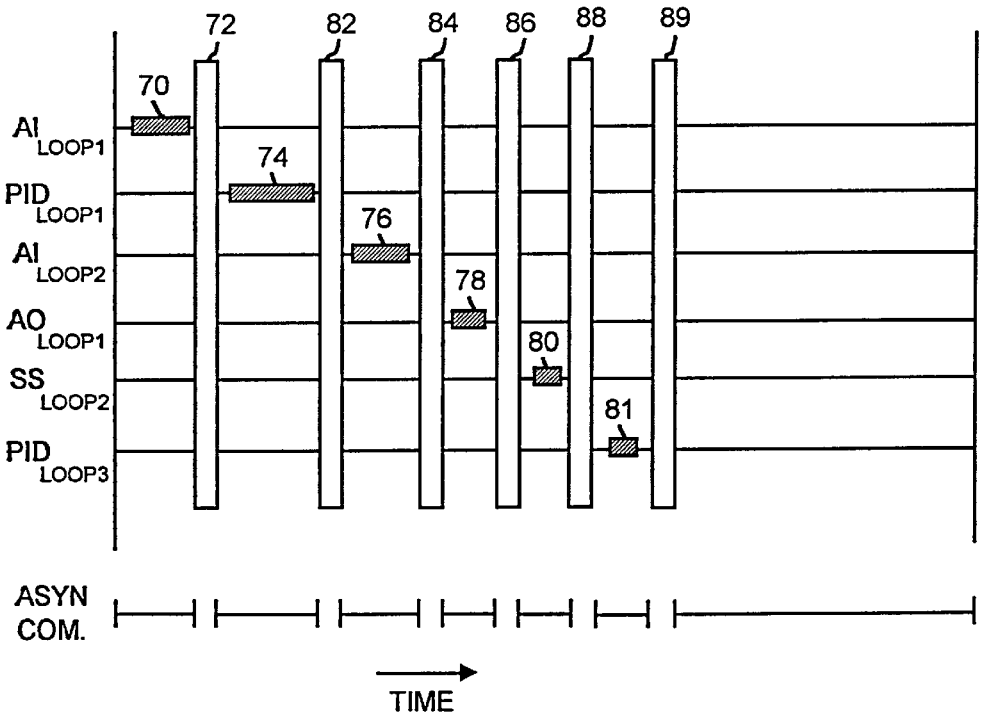
FIG. 5 is a timing schematic for a macrocycle of a segment of the bus of the process control network of FIG. 1.

FIG. 5 illustrates a timing schematic depicting the times at which function blocks on the bus segment 34b of FIG. 1 execute during each macrocycle of the bus segment 34b and the times at which synchronous communications occur during each macrocycle associated with the bus segment 34b. In the timing schedule of FIG. 5, time is indicated on the horizontal axis and activities associated with the different function blocks of the positioner/valve 16 and the transmitter 20 (of FIG. 3) are illustrated on the vertical axis. The control loop in which each of the unctions blocks operates is identified in FIG. 5 as a subscript designation. Thus $AI_{LOOP1}$ refers to the AI function block 66 of the transmitter 20, $PID_{LOOP1}$ refers to the PID function block 64 of the positioner/valve 16, etc. The block execution period of each of the illustrated function blocks is depicted by a cross-hatched box while each scheduled synchronous communication is identified by a vertical bar in FIG. 5.

Thus, according to the timing schedule of FIG. 5, during any particular macrocycle of the segment 34b (FIG. 1), the $AI_{LOOP1}$ function block executes first for the time period specified by the box 70. Then, during the time period indicated by the vertical bar 72, the output of the $AI_{LOOP1}$ function block is published on the bus segment 34b in response to a compel data command from the LAS for the bus segment 34b. Likewise, the boxes 74, 76, 78, 80, and 81 indicate the execution times of the function blocks $PID_{LOOP1}$, $AI_{LOOP2}$, $AO_{LOOP1}$, $SS_{LOOP2}$, and $PID_{LOOP3}$, respectively (which are different for each of the different blocks), while the vertical bars 82, 84, 86, 88, and 89 indicate the times that the function blocks $PID_{LOOP1}$, $AI_{LOOP2}$, $AO_{LOOP1}$, $SS_{LOOP2}$, and $PID_{LOOP3}$, respectively, publish data on the bus segment 34b.

As will be apparent, the timing schematic of FIG. 5 also illustrates the times available for asynchronous communication activities, which may occur during the execution times of any of the function blocks and during the time at the end of the macrocycle during which no function blocks are executing and when no synchronous communication is taking place on the bus segment 34b. Of course, if desired, different function blocks can be intentionally scheduled to execute at the same time and not all function blocks must publish data on the bus if, for example, no other device subscribes to the data produced by a function block.

Field devices are able to publish or transmit data and messages over the bus 34 using one of three virtual communication relationships (VCRs) defined in the Fieldbus access sublayer of the stack of each field device. A client/server VCR is used for queued, unscheduled, user initiated, one to one, communications between devices on the bus 34. Such queued messages are sent and received in the order submitted for transmission, according to their priority, without overwriting previous messages. Thus, a field device may use a client/server VCR when it receives a pass token message from an LAS to send a request message to another device on the bus 34. The requester is called the "client" and the device that receives the request is called the "server." The server sends a response when it receives a pass token message from the LAS. The client/server VCR is used, for example, to effect operator initiated requests such as set point changes, tuning parameter access and changes, alarm acknowledgements, and device uploads and downloads.

A report distribution VCR is used for queued, unscheduled, user initiated, one to many communications. For example, when a field device with an event or a trend report receives a pass token from an LAS, that field device sends its message to a "group address" defined in the Fieldbus access sublayer of the communication stack of that device. Devices that are configured to listen on that VCR will receive the report. The report distribution VCR type is typically used by Fieldbus devices to send alarm notifications to operator consoles.

A publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the bus 34 when the publisher device receives a compel data message from the LAS or from a subscriber device. The publisher/subscriber relationships are predetermined and are defined and stored within the Fieldbus access sublayer of the communication stack of each field device.

To assure proper communication activities over the bus 34, each LAS periodically sends a time distribution message to all of the field devices connected to a segment of the bus 34, which enables the receiving devices to adjust their local application time to be in synchronization with one another. Between these synchronization messages, clock time is independently maintained in each device based on its own internal clock. Clock synchronization allows the field devices to time stamp data throughout the Fieldbus network to indicate, for example, when data was generated.

Furthermore, each LAS (and other link master device) on each bus segment stores a "live list," which is a list of all the devices that are connected to that segment of the bus 34, i.e., all of the devices that are properly responding to a pass token message. The LAS continually recognizes new devices added to a bus segment by periodically sending probe node messages to addresses that are not on the live list. In fact, each LAS is required to probe at least one address after it has completed a cycle of sending pass token messages to all of the field devices in the live list. If a field device is present at the probed address and receives the probe node message, the device immediately returns a probe response message. Upon receiving a probe response message, the LAS adds the device to the live list and confirms by sending a node activation message to the probed field device. A field device remains on the live list as long as that field device responds properly to pass token messages. However, an LAS removes a field device from the live list if the field device does not, after three successive tries, either use the token or immediately return the token to the LAS. When a field device is added to or removed from the live list, the LAS broadcasts changes in the live list to all the other link master devices on the appropriate segment of the bus 34 to allow each link master device to maintain a current copy of the live list.

As noted above, the communication interconnections between the function blocks of the field devices and the execution times of the function blocks are determined by a user and are implemented within the process control network 10 using a configuration application located in, for example, the host 12 which programs the LAS to schedule the execution times and communication times of the function blocks. It is generally undesirable, however, to simply implement a process control scheme and then start the process running without first testing that scheme to assure that no bugs are present and to assure that the process control loops of the control scheme are properly tuned. In fact, a minor error somewhere in the process control scheme may cause the process to become unstable very quickly, which can be unsafe and may damage process control components. Furthermore, even if the control scheme is correct, there are parameters, such as timing parameters, gains, etc. that need to be tuned to assure proper process operation. It is desirable, therefore, to provide a mechanism for stopping and starting the operation of the process at different times during the operation of any given control loop and to provide a mechanism for viewing the state of the process or a process control loop by viewing the values of process parameters at distributed locations within the control loop to assure that control loop is functioning according to the desired plan and/or to tune certain parameters within the control loop.

While a Fieldbus process control network could be debugged or tuned by having a host 12 set up trending blocks in each of the devices, collect the values of the trended data and then display that data to user after the process control loop has begun to execute, to perform this type of communication, the host 12 must use asynchronous (non-published) communications which allow the host 12 access to the bus 34 only when the host 12 receives a pass token message from an LAS. As a result, the host 12 has no way of guaranteeing that the feedback data collected by the trend object(s) will not be lost due to overwrites, etc. Also, the host 12 may have no way of determining precisely when the trend data was collected with respect to the operation of other blocks within the control loop or may have to regenerate the timing of the loop to determine what control functions were occurring when the data was collected. This process may be inaccurate, tedious and time consuming and, furthermore, does not actually stop the operation of the process control loop when the data is collected.

According to the present invention, breakpoints or single-step stopping points are set in or between the devices and/or the functions blocks making up a process control loop and operate to allow a process control loop within a process control network having distributed control functions to stop when one of the breakpoints or single-step stopping points is reached. Moreover, a tuning procedure may enable the process control loop to execute for one or more complete cycles to produce a "trace" of the process control loop, which can then be used to retune the process control loop. Thus, according to the present invention, values of process control variables or parameters are stored in a memory of one or more of the field devices and are delivered, via the bus, to a user to enable the user to view the state of the process control loop at each of the breakpoints or single-step stopping locations, or during a tuning procedure.

If desired, the breakpoints or single-step stopping points may be located at a device and occur when the device operates within the process control scheme, may be located between the different process control functions, such as between the function blocks, of a process control loop and/or may be located within an algorithm making up any particular process control function. Of course, a device manufacturer must typically provide breakpoint and single-step stopping point functionality within the algorithm making up the function block because these algorithms are typically proprietary to the device manufacturer and are usually fixed or hardcoded into a memory within the field device.

At each of the breakpoints, the single-step stopping points or the tuning stopping points, operation of the process control scheme stops automatically until commanded to start again by the user via asynchronous communications over the bus 34. If desired, any of the breakpoints, single-step stopping points or tuning procedures may have one or more conditions associated therewith which, when met, cause the algorithm or the process control network to cease operation and, if not met, cause the process control scheme to continue without interruption. The condition may be associated with the value of some variable, a time, or any other desired condition. Of course, the breakpoints and stopping points may also be turned on or off so that a user can control which of a number of breakpoints or stopping points are to be operational during a particular debugging procedure.

Upon reaching a breakpoint or a single-step stopping point, one or more devices deliver the values of desired variables to the user over the bus 34 using either synchronous or asynchronous communications to allow the user to view the state of the process control network at the breakpoint or the single-step stopping point and to view the condition that caused the break or the stop to occur.

While breakpoints and single-step stopping points are typically located within or between the function blocks of a process control loop, a tuning procedure may have a break located at the end of a process control loop execution cycle (i.e., at the end of each macrocycle or after the completion of a predetermined number of macrocycles of a bus segment) to stop execution of the loop. Thereafter, the tuning procedure may provide the user with data pertaining to loop operation during the preceeding macrocycles and allow the user to change certain tuning parameters within any of the process control functions or function blocks to thereby retune the process control loop. Of course, these communications may be performed using asynchronous communications on the bus 34 while normal operation of the control loop is suspended.

Figure 6A:
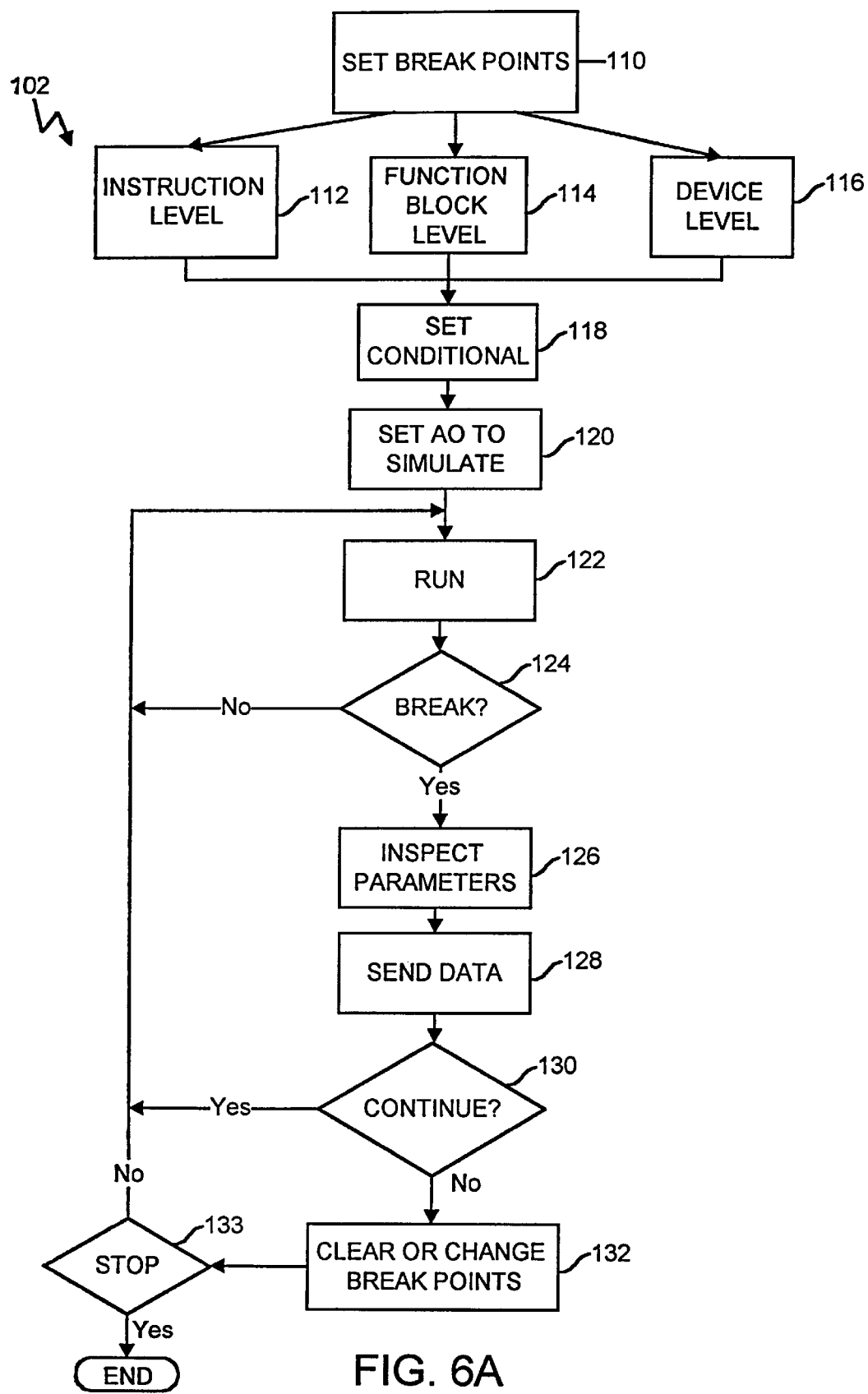
FIG. 6A is a flow chart illustrating the operation of a breakpoint routine for use in debugging the process control network of FIG. 1.
Figure 6B:
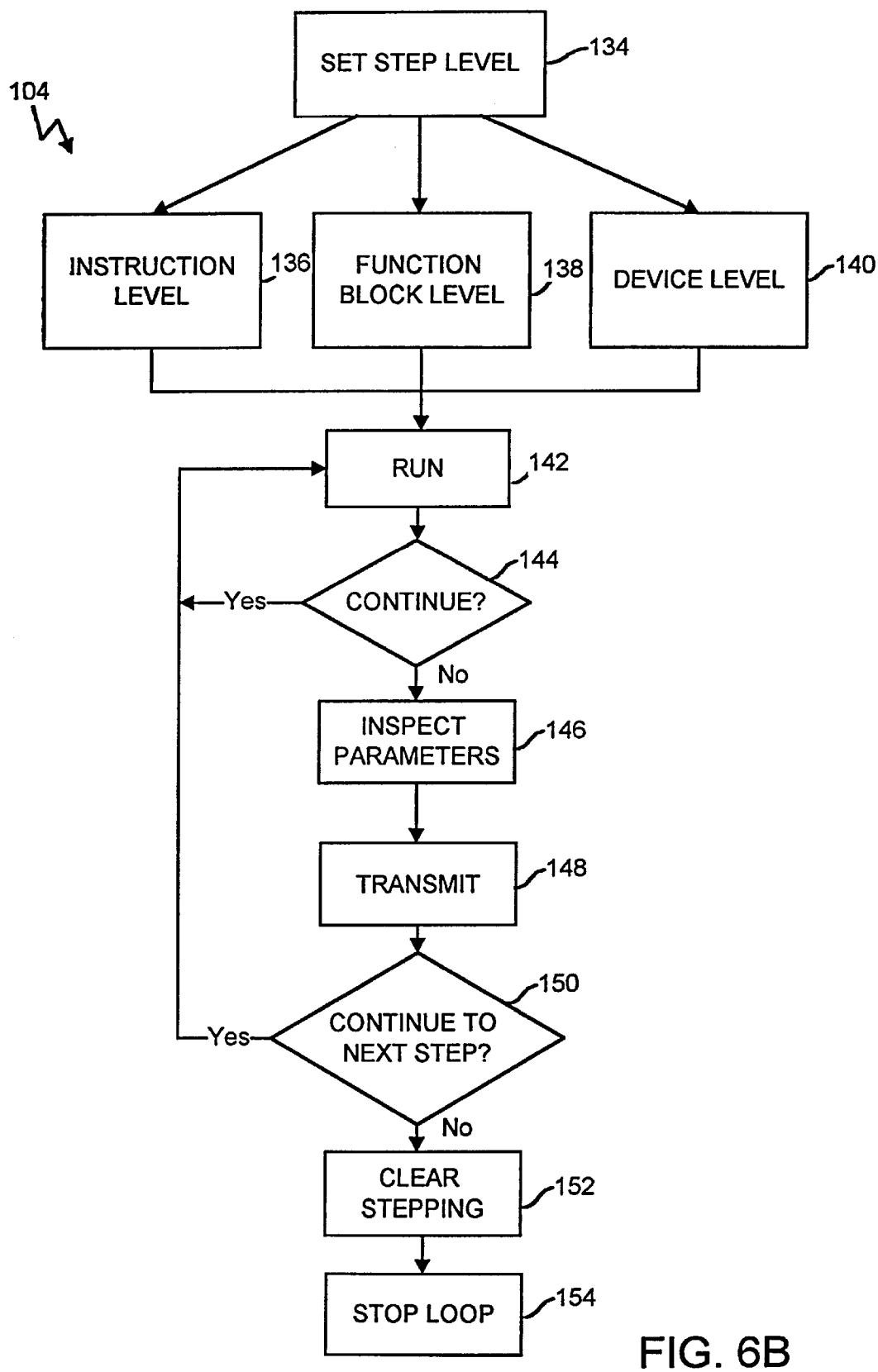
FIG. 6B is a flow chart illustrating the operation of a stepping routine for use in debugging the process control network of FIG. 1.
Figure 6C:
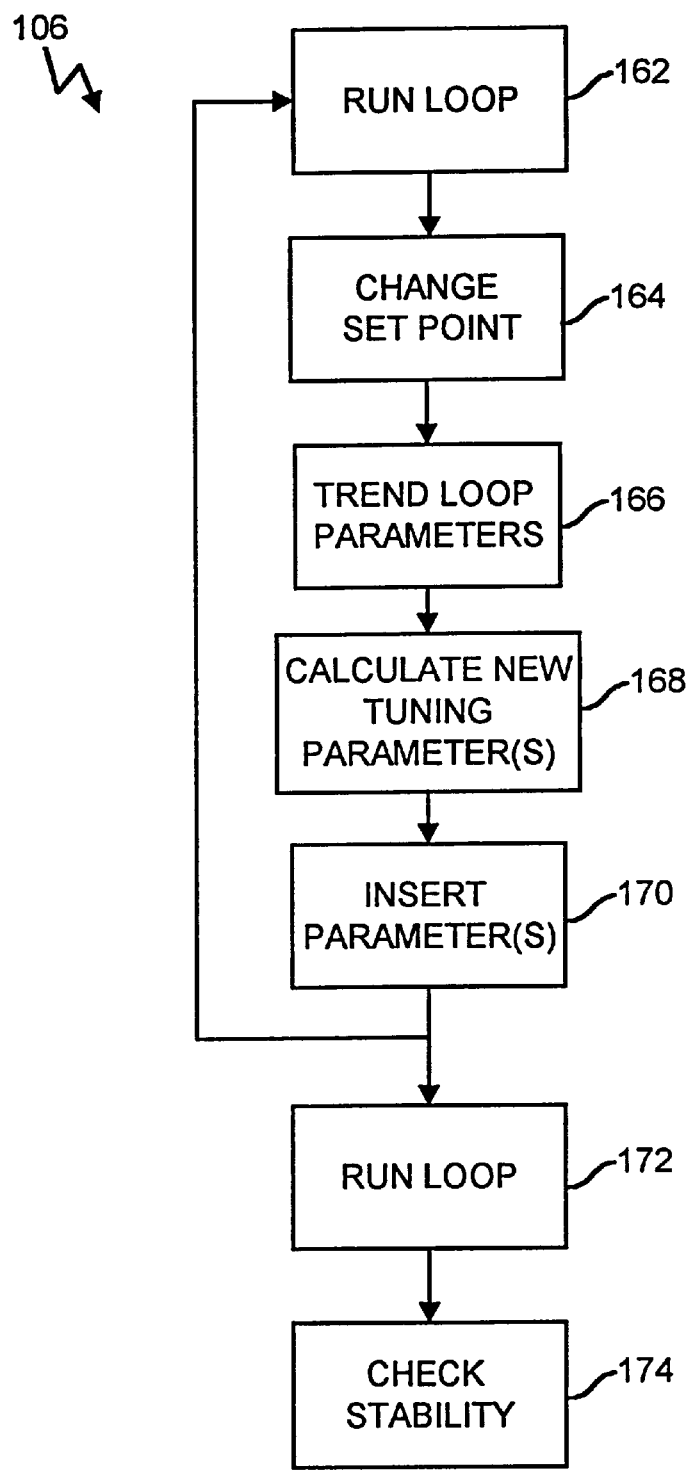
FIG. 6C is a flow chart illustrating the operation of a tuning routine for use in tuning the process control network of FIG. 1.

Referring now to FIGS. 6A, 6B and 6C, flow charts of methods for debugging and tuning a process control loop according to the present invention are illustrated. The methods for debugging and tuning a process loop are generally utilized by a process engineer to achieve visibility with respect to the operations of the process control network while controlling the flow of the process control loop. These methods for debugging and tuning a process control loop allow the process engineer to perform process control loop initialization and to detect problems resulting from an improper initialization or resulting from changes in the system over time. Of course, the methods for debugging and tuning a process control loop of FIG. 6 may be activated as normal start-up activities to bring a process control loop on-line. It should be noted that the elements or routines making up these loops may be stored in one or more memories in a host device and/or in memories in one or more of the field devices as discussed in more detail below.

When debugging and tuning a process control loop, three general routines including a breakpoint handling routine 102 (FIG. 6A), a single-step mode handling routine 104 (FIG. 6B), and a tuning handling routine 106 (FIG. 6C) may be used. Each of the three routines 102, 104, and 106 are operational only in a debugging or tuning mode of operation which may be initiated by a host computer, such as the host 12 of FIG. 1, by sending a command to the function blocks having breakpoint, single step and tuning capabilities to cause the breakpoints and single-step operations to become active. At this time, the host 12 may specify (in accordance with user instructions) which breakpoints are to be turned on, what the breaking conditions at each breakpoint are to be and what data should be collected at the breakpoints (or single-step stopping points) to be sent to the host device 12 for display to a user. For a tuning procedure, the host 12 may specify the parameters to be viewed and/or potentially changed, the number of loop execution cycles to be performed before changes in the tuning parameters are allowed, etc. In effect this command or series of commands places the process control network in a debugging or a tuning mode.

Referring to FIG. 6A, the breakpoint handling routine 102 controls the flow of a process control loop as the control loop executes function blocks in multiple field devices, such as the field devices 16, 18, 20 and 22 on the bus segment 34b of FIG. 1. A block 110, which may be implemented by software within a host device having a user interface, the location of and other data associated with each of the desired breakpoints is set using, for example, asynchronous communications over the bus 34. Breakpoints may be set at an instruction level (step 112), in which the execution of a particular instruction within a device or a function block of a device causes a break condition to be examined, at a function block level (step 114), in which data flow to or from a particular function block or the execution of a function block of a process control loop causes a break condition to be examined, and/or at a device level (step 116), in which data flow to or from a device or operation of a device causes a break condition to be examined. Of course, multiple breakpoints may be set and different breakpoints may be set at different instruction, function block and device levels.

At the instruction level, breakpoints are set within a function block at a selected instruction address location. At the execution of the designated instruction address the breakpoint condition is examined to see if the condition is met. If so, execution is terminated. Although this type of breakpoint is similar to the breakpoint capability of centralized processors in general, the referenced instruction is within a device located at a remote position with respect to the user interface terminal, not in the host device.

At the function block level, breakpoints are set on the transfer of data between function blocks or at the end or beginning of the execution of a function block. The breakpoints between function blocks may be forced by controlling the LAS in the operating system to prevent a compel data message from being delivered to the next function block until after the user has sent a message indicating that operation of the process control loop should continue. In this instance, the LAS, which is controlled by the Fieldbus communication stack, is directed to stop a selected function block from executing until commanded to execute by a user.

At the device level, breakpoints are set within a function block at the location of a specified device address. At the execution of the designated device, execution is terminated or halted based on the breakpoint condition.

A step 118 sets each of the defined breakpoints to occur unconditionally or conditionally upon a selected event and stores an indication of the parameters of that event (e.g., the values of a parameter causing a conditional break, etc.) in an LAS device or in other ones of the devices in accordance with user input delivered to the host 12.

A step 120 sets a function block, typically the most upstream function block of a control loop such as an analog output (AO) function block, to simulation operational status so that data parameters that are accessed during operation of the control loop are sent to host device 12 via the bus 34. Thereafter, at a step 122, the process control loop is run until an active breakpoint is detected by a step 124. Generally speaking, one or more controllers for implementing the breakpoint handling routine 102 may reside in the device having the LAS and/or other devices and may control the LAS for the appropriate bus segment to allow the process control network to execute, until reaching a breakpoint. At the breakpoint, the LAS controller or other controller stops execution of the process control loop, and allows access to selected parameters stored in the function blocks of the field devices within the relevant process control loop. Thus, a step 126 accesses selected parameters and a step 128 transmits these parameters along with data indicative of the location of the breakpoint and data pertaining to the reason that the breakpoint occurred (e.g., the condition) to the host 12 for display to a user. The host 12 can also acquire additional process data (for display to the user) using any known or desired communication method.

In a Fieldbus system, a view function block operation, which allows the Fieldbus communication software stack of a device to read published variables by adding link objects to general purpose input blocks, as needed, or a custom function block that is executed to update a display of published variables, may be used to inspect process data at a breakpoint. The view function block operation eliminates the need to separately poll for the variables which, in turn, reduces the number of bus cycles needed to retrieve data that is already available on the bus.

A step 130 continues to run the process control scheme (by returning to the step 122) when instructed to do so by the user via the host 12. If the user does not wish to continue but, instead, wants to stop or change the breakpoints, a step 132 clears or changes the breakpoints within the process control network as instructed by a user via the host 12. A step 133 then proceeds to run the process control scheme with the new breakpoints or breakpoint conditions installed (by returning control to the step 122) or terminates the breakpoint routine 102. As will be described in more detail hereinafter, the different steps are preferably performed by software in the LAS device of the bus or in the individual field devices as necessary to control the operation (stopping and starting) of the function blocks within the process control loop being debugged.

Referring now to FIG. 6B, the single-step mode handling routine 104 controls the flow of a process control loop as the control loop executes function blocks in multiple field devices within the process control network 10. The singlestep mode handling routine 104 may control the LAS device to execute the process control network until a single-step stopping point is reached, to stop execution of the loop, to then access selected parameters stored in or generated by the function blocks of the field devices within the process control network 10 and to then send such data to a host device for display to a user.

In particular, a step 134 sets a step level at an instruction level (step 136), at a function block level (step 138) and/or at a device level (step 140), similar to those same levels in the routine 102 of FIG. 6A. Thus, when stepping at an instruction level, steps are set at each instruction address location within a function, i.e., they are set within the algorithm that implements a function of a function block. At the execution of the designated instruction address, execution is terminated. When stepping at the function block level, addresses between each function block are specified. As with breakpoints between function blocks, these single-step stopping points may be accomplished by controlling the LAS in the loop to stop execution at the end of each function block execution or publishing time. In one embodiment, the LAS is controlled by the Fieldbus communication stack to stop selected function blocks from executing. When stepping at a device level, steps are set at the location of a each device address. At the execution of the designated device, execution of the process control scheme for the loop is terminated.

A step 142 then runs the process control network by, for example, enabling the LAS device to publish compel data commands and a step 144 determines if a single-step stopping point has been reached. If not, the step 142 repeats until a single-step stopping point is reached. When a stopping point is reached, a step 146 retrieves parameters or other specified data associated with the single-step stopping point, and a step 148 transmits this data to the user at the host device. At this time, data indicative of the location of the single-step stopping point may also be sent to the host device for display to a user.

The single-step mode handling routine 104 continues at a block 150 and, at the direction of a user via the host 12, returns control to the run step 142 unless the host 12 directs that the single-step mode handling routine 104 be terminated. If so, single-stepping mode is cleared by a step 150 and the routine 104 is terminated.

The breakpoint handling routine 102 and the single-step mode handling routine 104 allow an operator to analyze process data and function blocks and to detect problems that may be present in a control strategy without the process control scheme running through a large number of cycles, during which time the process control network may become unstable. Furthermore, these routines allow a user to view data associated with the process control loop that would not normally be sent to a host device or displayed to a user to thereby allow the user to debug a process control scheme.

Referring now to FIG. 6C, a flow chart illustrating the operation of the tuning routine 106 is provided. Tuning is typically used to set gains or time constants in, for example, PID function blocks such as the PID function block 64 of FIG. 4, so that control loops produce appropriate outputs during operation. Of course, PID control is preferably adjusted so that the process control loop responds reasonably fast to changes in inputs (i.e., so that the loop is not overdamped) but so that the process control loop does not respond so fast that the loop oscillates a great deal in response to a change in a process output or a change in a set point (i.e., so that the loop is not underdamped).

The tuning routine 106 begins with a step 162 that initiates a control loop with a set of test tuning parameters. After the control loop (such as the LOOP1 of FIG. 4) runs for a selected amount of time or a predetermined number of macrocycles, a step 164 changes an operational set point or some other parameter or value of the loop and, thereafter, a step 166 trends loop data or parameters by collecting and storing values of predetermined parameters in a memory during, for example, each macrocycle of the loop. After, for example, a preset number of runs of the process control loop (i.e., macrocycles), the response of the loop can be determined because a trace of the loop has been captured. At this time, execution of the loop is stopped or interrupted and the captured data is delivered to a tuner device and/or to a user. In the tuner, a step 168 then calculates new tuning parameters based on the past performance of the loop (i.e., the trended parameters) or, alternatively, a user views the data and provides new tuning parameters manually. Next, a step 170 inserts the new tuning parameters (such as PID gain, time constants, etc.) into the appropriate function blocks within the loop being tuned. If desired, the steps 162 to 170 may be then be repeated as desired to adjust the tuning parameters. After an appropriate set of gain or other tuning parameters is identified, the control loop continues to run (at a step 172) and a step 174 checks the stability of the loop with the new parameters. When the loop is stable and properly tuned, the tuning routine 106 may be discontinued and the loop may be brought on-line in any desired manner.

The methods 102, 104 and 106 for debugging and tuning a process control loop operate by visualizing data in real-time (or at suspended times) as the process control loop cycles and by controlling the loop to take command of, for example, the LAS to perform breakpoint and single step operations. Furthermore, parameters are adjusted during real-time operations of the control loop while other devices on the bus 34 continue to operate normally, which allows a control loop to be isolated and debugged without taking the rest of the process off-line.

There are a number of different ways in which the debugging and tuning methods of the present invention may be implemented in a process control network having distributed control functions. For example, the breakpoint, single-step and the loop tuning routines 102, 104 and 106 may be implemented by having all the necessary debugging and/or tuning parameters (such as breakpoint and stopping point addresses, conditions, loop execution conditions, etc.) stored in the communication stack of the LAS to control communications and to control the execution of the function blocks within a process control loop when the process control loop is in a debugging or a tuning mode.

Figure 7:
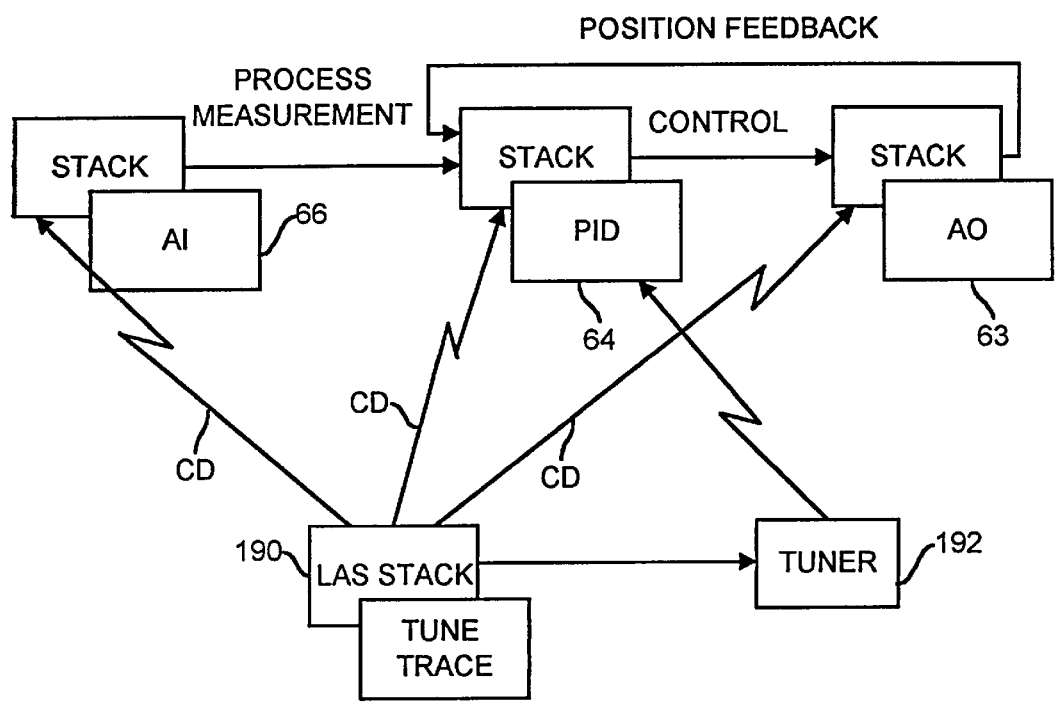
FIG. 7 is a schematic block diagram illustrating the operation of a set of function blocks in the process control loop of FIG. 4 during a tuning routine.

Referring to FIG. 7, the process control loop, LOOP1, of FIG. 4 is illustrated as having the communicatively interconnected function blocks 66, 64 and 63 (each having a communication stack associated therewith). Furthermore, a communication stack 190 of the LAS device, which may be any of the devices on, for example, the bus segment 34b of FIG. 1, is also shown to illustrate the communications between the LAS and the function blocks 66, 64, and 63. In this embodiment, the communication stack 190 is configured to include the debugging and/or trace-tune procedures used to allow the function blocks 66, 64 and 63 (or the devices in which these function blocks are located) to operate independently, in a "snap-shot" mode of operation, to thereby enable the use of breakpoints, single-step stopping points and tuning procedures. Furthermore, in this configuration, the stacks associated with the function blocks 66, 64, and 63 are slave stacks that do not become operational unless directed to do so by a command from the master stack, in this case the stack 190 of the LAS device.

To perform breakpoint, signal step or loop analysis, the master stack 190 sends compel data messages to the function blocks 66, 64 and 64 in the order specified by, for example, the timing schedule of FIG. 5. However, the trace-tune feature of the master stack 190 stores or otherwise keeps track of the locations of each of the breakpoints or single-step stopping points (or tuning stopping points) and, when such a breakpoint or stopping point is reached, halts operation of the process control loop to determine if a breakpoint condition has been reached or stops operation in the presence of a single-step break point. To perform these functions, the master stack 190 may receive an instruction from a function block or may receive data from a function block enabling the master stack to determine if a breakpoint condition is satisfied. Of course, when a condition associated with a breakpoint is not satisfied, the LAS continues to issue communication enabling messages (compel data messages) to implement the process control scheme or strategy. However, when a valid breakpoint or stopping point is reached, the trace-tune procedure of the master stack 190 publishes collected or trended data to the user via the bus, compels one or more appropriate devices to publish collected or trended data to the user via the bus or takes other actions necessary to inform the user (via a host device) that a break, or single-step stop has occurred, the reason for the breakpoint, and/or the conditions of the loop at the breakpoint or stopping point.

Likewise, the master stack 190 may receive instructions from the user (via the host 12) to continue, change tuning parameters, etc. The master stack 190 continues to run the process control network by sending further compel data commands and pass token commands over the bus 34 when a breakpoint (or a single-step stopping point) has not been reached or when the user instructs the master stack (via the bus 34) to continue until the next breakpoint, single-step or until a trace of the loop has been recorded. In this manner, the master stack within the LAS device (or some other device) controls operation of the process control loop to allow the implementation of the breakpoints, the stopping points and the tracing features of the routines 102, 104 and 106 of FIG. 6. Of course, the trace-tune instructions may be encoded in the stack of the LAS device or other device and may include instructions necessary to communicate with a host or user to receive the proper initialization data (which breakpoints to turn on, what data to publish, etc.). When used in the tuning routine 106, the master stack 190 may deliver trended or other data collected during the previous running of the process control loop to a tuner 192 located in the host, in the LAS device or any other device, and/or may send the data to a host for display to a user. The tuner 192 uses this data to calculate a new tuning parameter and/or may receive a new tuning parameter from a user. The tuner 192 then sends the new tuning parameter to the appropriate device for use therein and the LAS device then starts the process control scheme over or allows the control scheme to continue.

In another embodiment, a separate trace-tune function block may be associated with each of the function blocks or devices within a process control loop and these one or more trace-tune function blocks may operate to control the function blocks within the loop during a tuning or debugging procedure to enable breakpoints, single-step stopping points and tuning of the process control loop. For example, referring to FIG. 8, the AI function block 66 is illustrated as including a trace-tune function block 200 while the PID function block 64 and AO function block 63 are illustrated as sharing a trace-tune function block 202. However, if desired, separate trace-tune function blocks may be provided for each of the PID and AO function blocks 64 and 63 or one trace-tune function block may be used for any combination of function blocks within a device.

Figure 8:
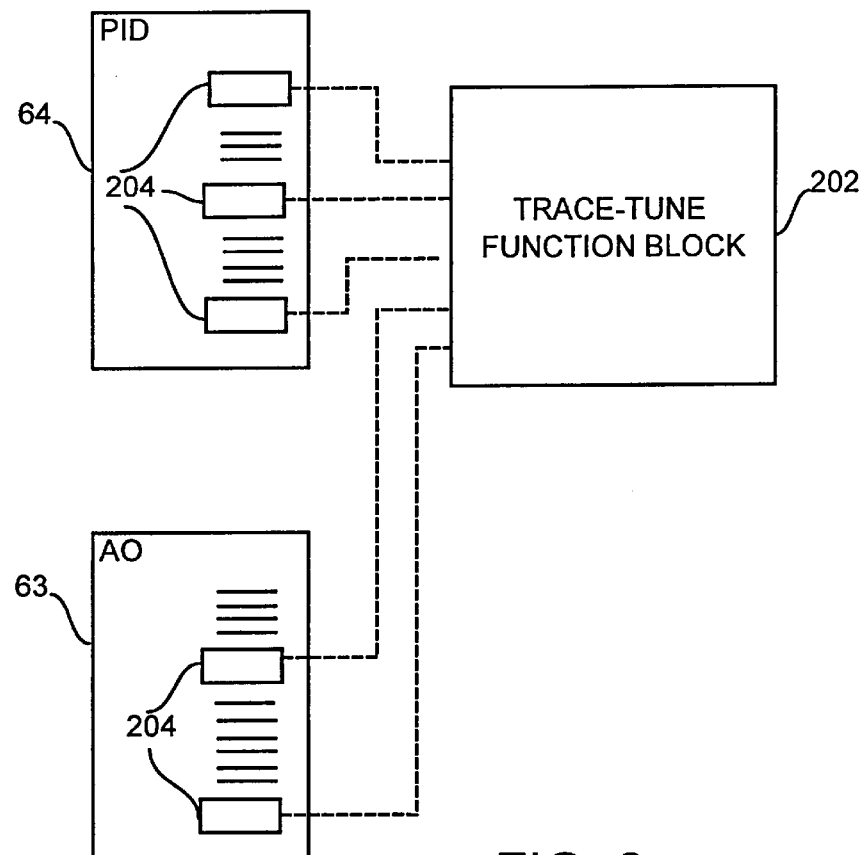
FIG. 8 is a diagram of a trace-tune function block that enables breakpoint, single-stepping and tuning according to the present invention.

As also illustrated in FIG. 8, each of the function blocks 66, 64 and 63 include breakpoint and/or stopping point locations 204, each of which may have a one or more conditions associated therewith. As will be understood, the function blocks 66, 64 and 63 may include any number of breakpoints or other single-step stopping points programmed within the algorithm therein and/or these breakpoints or stopping points may be located at other addresses within the function blocks or at addresses within a device.

When initiating a breakpoint, a single-step stopping point or a loop tuning procedure, the trace-tune function block 200 or 202 associated with each function block within the loop) are initiated by, for example, a host 12, and these tracetuned function blocks are used to set the breakpoint conditions at each of the breakpoints locations 204 after receiving such conditions from a user or from a master trace-tune function block located within, for example, a host device. After the breakpoint, single steps, loop tuning conditions, the addresses or other pointers identifying each breakpoint, single step or loop tuning condition are stored in the trace-tune function blocks 200 and 202 or the function blocks 66, 64 and 63, the LAS device associated with the control loop begins execution until a breakpoint, a single step stopping point or a loop tuning stopping point is reached. In particular, each breakpoint within an algorithm, such as algorithm of the AI function block 66 is checked to see if the breakpoint condition associated with a break point is met and, if so, an indication of such is communicated to the trace-tune function block 200 which then immediately changes the mode of the AI function block 66 to a break mode which, in turn, causes cascading or shedding of mode in function blocks upstream in the process control loop. At this time, the trace-tune function block 200 may publish data within or associated with the AI function block 66 and the breakpoint condition via synchronous or asynchronous bus communications to deliver such data to a user (or host device) or to a master trace-tune function block that controls communication with a host device. The user may then send a signal over the bus 34 to command the trace-tune function block 200 to allow the function block 66 to continue operation, to change tuning parameters, etc. or to perform the other functions specified in the routines 102, 104 and 106.

When the AI function block 66 is completed, the trace-tune function block 200 may halt operation of the loop by again placing the AI function block 66 in a break mode before the AI function block 66 publishes its data on the bus 34 to thereby cause a single-stepping function. Once again, at this time, relevant device or function block data may be sent to the host by the trace-tune function block 200. Of course, this data may be stored in the function block 66, 64 or 63 performing the process control function or may be stored in the trace-tune function block 200.

After the user has indicated that the process control routine should continue, the trace-tune function block 200 changes the mode of the AI function block 66 back into normal mode which causes AI function block 66 to continue execution or to publish its data to the PID function block 64 which may begin operation. During this time, the trace-tune function block 202 interfaces with the PID function block 64 and the AO function block 63 to determine whether any breakpoint, single step or tuning stopping location is reached and, if so, changes the mode of the appropriate function block 64 or 63 to thereby halt operation of the process which, in turn, causes mode shedding in the function blocks upstream of the function block in which the break occurs. Similar to the trace-tune function block 200, the trace-tune function block 202 detects the occurrence of breakpoints, single-step stopping points or tuning stopping points before, during or after the execution of the function blocks 64 and 63 to thereby enable operation of any of the routines 102, 104 or 106.

In this manner, the trace-tune function blocks 200 and 202 can control breakpoints or stopping points within the code of the algorithms of any of the function blocks of a control loop as well as between any two of the function blocks of a control loop, such as immediately before or after a function block publishes its data on the bus 34 or at the start of any device operation. Likewise, the trace-tune function blocks 200 and 202 can send trended or other requested data to a host device when a breakpoint or other stopping point is reached. Still further, the trace-tune function blocks 200 and 202 control the stopping and starting of the execution of a loop by changing the mode of a device with which it is associated. When used in a tuning routine, the trace-tune function block 200 or 202 may cause the associated function blocks to trend or otherwise collect appropriate tuning data, may view this data or store that data in a memory associated with the trace-tune function block and may send this data to a tuner or host device for use in displaying to a user and/or calculating a new tuning parameter, such as a PID gain. Likewise, a trace-tune function block associated with, for example, a PID function block, such as the block 64, may store the new tuning parameter in the appropriate memory location in the PID function block 64 and allow the process loop to continue or to start over.

Of course, at start-up of a breakpoint, signal-step or tuning routine, the trace-tune function blocks 200, 202, etc. must be initialized to assure that they operate to properly control each of the function blocks within the control loop. The trace-tune function blocks 200 and 202 may be set up to not interfere with the process control loop during normal operation thereof and will only halt operation of the loop when a debug or tuning procedure is initiated.

In order to collect and send data pertaining to a function block, a device, or a control loop to a user, the trace-tune function blocks 200 and 202 may trend data or may cause the function blocks that they control to trend data and may provide the trended data to the host for use in identifying process conditions at a breakpoint or a stopping point and to identify new tuning parameters after the execution of any particular loop of a process control loop.

Of course, if desired, other methods of implementing trace-tune function blocks or trace-tune functions such as breakpoints, single step points and tuning points may be used as desired in a process control network to control the individual operation of each of function block or device within a process control loop to thereby enable the stylized and specialized stopping and starting of those function blocks at predetermined or desired locations so as to debug and tune a process control network.

Although the function blocks 200 and 202 have been described herein for use in performing debugging and tuning procedures on or using a loop comprising an AO function block, an AI function block and a PID function block connected in a simple control loop configuration, the trace-tune function blocks and other debugging and tuning routines of the present invention can be used in conjunction with other function blocks and other control functions as desired and can be implemented in control loops having configurations other than that illustrated herein. Still further, the operations of the function blocks 200 and 202 can be performed by software within a device in connection with the function blocks of that device without being a fieldbus "function block." It is advantageous, however, to use function blocks to allow ease of communication over the bus during the debugging or tuning mode.

Moreover, while the debugging and tuning capabilities have been described herein as used with and performed by Fieldbus "function blocks," it is noted that the debugging and tuning capabilities of the present invention can be implemented using other types of blocks, programs, hardware, firmware, etc., associated with other types of control systems and/or communication protocols. In fact, while the Fieldbus protocol uses the term "function block" to describe a particular type of entity capable of performing a process control function, it is noted that the term function block as used herein is not so limited and includes any sort of device, program, routine, or other entity capable of performing a process control function in any manner at distributed locations within a process control network. Thus, the debugging and tuning function blocks or routines described herein can be implemented in other process control networks or using other process control communication protocols or schemes (that may now exist or that may be developed in the future) which do not use what the Fieldbus protocol strictly identifies as a "function block" as long as these networks or protocols provide for or allow control functions to be performed at distributed locations within a process.

Still further, while the debugging and tuning functions and function blocks have been described herein as being used in performing debugging and tuning of control loops including positioner/valve devices, it is noted that these functions and function blocks can be used to perform debugging and tuning in control loops using other types of devices, such as those having moveable elements like dampers, fans, etc.

Moreover, although the debugging and tuning functions described herein are preferably implemented in software stored in one or more process control devices, they may alternatively or additionally be implemented in hardware, firmware, etc., as desired. If implemented in software, the debugging and tuning functions of the present invention may be stored in any computer readable memory such as on a magnetic disk, a laser disk, or other storage medium, in a RAM or ROM of a device, etc. Likewise, this software may be delivered to a user or a device via any known or desired delivery method including, for example, over a communication channel such as a telephone line, the internet, etc.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A system for use in debugging or tuning a process control network having distributed control functions implemented by a plurality of field devices communicatively linked over a bus, wherein each of the field devices is capable of performing one or more process control functions and one or more communication functions, the system comprising:

a process control operation scheduler that schedules the execution of each of the process control functions and the communication functions performed by the plurality of devices to define a process control scheme;

an indicator that indicates a process control scheme location implemented by one of the plurality of field devices at which the process control scheme is to be interrupted when the process control scheme is in a debugging/tuning mode; and a controller that stops execution of the process control scheme at the indicated flow location when the indicated flow location is reached and the process control scheme is in the debugging/tuning mode.

2. The system of claim 1, wherein the scheduler controls communication over the bus by sending communication enabling messages to the plurality of field devices and wherein the controller is coupled to the scheduler to prevent the scheduler from sending communication enabling messages to the field devices when the process control scheme is at the indicated process control scheme location to thereby interrupt the process control scheme.

3. The system of claim 1, wherein the controller further includes a communicator that receives instructions from a host device communicatively connected to the bus and means for causing the operation of the process control scheme to continue in response to user input at the host device.

4. The system of claim 3, wherein the communicator includes means for retrieving process control data pertaining to the state of the process when the process control scheme is interrupted and means for sending the retrieved process control data to the host device for display to a user.

5. The system of claim 3, wherein the indicator indicates a conditional breakpoint in the process control scheme and the indicator includes means for storing a condition associated with the conditional breakpoint and means for determining if the condition associated with the conditional breakpoint is satisfied when the conditional breakpoint is reached within the process control scheme.

6. The system of claim 3, wherein the indicator indicates a multiplicity of single-step stopping points in the process control scheme.

7. The system of claim 3, wherein the indicator indicates a tuning stopping point within the process control scheme, and wherein the system further includes means for storing process data for a process parameter generated before the process control scheme is interrupted, a tuner that determines a process tuning parameter for the process control network based on the stored process data and means for communicating the process tuning parameter to one of the plurality of field devices.

8. The system of claim 7, wherein the process tuning parameter is a gain.

9. The system of claim 1, wherein the indicator indicates one of the plurality of field devices so that the process control scheme is interrupted when the one of the plurality of field devices is scheduled to operate within the process control scheme.

10. The system of claim 1, wherein the indicator indicates an instruction address within one of the functions of the one of the plurality of field devices to cause interruption of the process control scheme when the instruction address is implemented in the process control scheme.

11. The system of claim 1, wherein the indicator indicates a function of the one of the plurality of field devices to cause interruption of the process control scheme when the function is implemented by the one of the plurality of field devices in the process control scheme.

12. The system of claim 1, wherein the controller includes means located in at least the one of the plurality of field devices for interrupting operation of a function performed by the one of the plurality of field devices when the indicated location is associated with the operation of the one of the plurality of field devices.

13. The system of claim 1, wherein the controller includes interrupting means located in each of the plurality of field devices, wherein each of the interrupting means interrupts operation of a function performed by an associated field device when the indicated location is associated with the operation of the associated field device.

14. A method of debugging or tuning a process control network having distributed control functions implemented by a plurality of field devices communicatively linked over a bus, wherein each of the field devices is capable of performing one or more process control functions and one or more communication functions, the method comprising the steps of:

scheduling an order of execution for the process control functions and the communication functions to define a process control scheme;

marking one or more process control scheme locations associated with the process control functions or the communication functions at which the process control scheme is to be interrupted;

running the process control scheme;

detecting when any one of the plurality of field devices implements a control function or a communication function making up one of the marked process control scheme locations;

interrupting execution of the process control scheme at the one marked process control scheme location;

waiting for a user to indicate that execution of the process control scheme should continue; and starting the process control scheme at the one marked location upon receipt of a user indication that execution of the process control scheme should continue.

15. The method of claim 14, wherein the step of running the process control scheme includes the step of sending communication enabling messages to different ones of the plurality of field devices at different times and the step of interrupting execution of the process control scheme includes the step of discontinuing the step of sending communication enabling messages until receipt of the user indication.

16. The method of claim 14, further including the steps of retrieving process data pertaining to the state of the process when the process control scheme is interrupted and sending the retrieved process data via the bus to a host for display to a user.

17. The method of 14, wherein the step of marking includes the steps of marking one of the process control scheme locations as a conditional breakpoint and storing a condition associated with the conditional breakpoint, and wherein the step of interrupting includes the steps of determining if the condition associated with the conditional breakpoint is satisfied when the process control scheme reaches the conditional breakpoint and automatically continuing with the process control scheme if the condition is not satisfied.

18. The method of claim 14, wherein the step of marking includes the step of marking a multiplicity of the process control scheme locations as single-step stopping points.

19. The method of claim 14, wherein the step of marking includes the step of marking the one or more of the process control scheme locations as a process control tuning stopping point within the process control scheme, and wherein the method further includes the step of retrieving process data associated with a process parameter from one of the plurality of field devices before the process control scheme is interrupted, determining a process tuning parameter for the process control network using the stored process data and communicating the process tuning parameter to another of the plurality of field devices.

20. A process control device for use in a process control network having distributed control functions implemented by a plurality of field devices communicatively coupled to a bus, wherein each of the field devices includes one or more function blocks capable of performing an input function, an output function, or a control function within the process control network and capable of communicating on the bus, the process control device comprising:

a first function block that implements a process function to perform a portion of a process control scheme;

a memory that stores an indication of a point within the process control scheme associated with the first function block or with the device; and a trace-tune function block communicatively coupled to the first function block including means for controlling the process control device to interrupt the process control scheme at the indicated point when the process control scheme reaches the indicated point.

21. The device of claim 20, wherein the first function block includes an algorithm that performs the process function and software that communicates via the bus after execution of the algorithm and wherein the indication indicates a point before or after execution of algorithm of the first function block.

22. The device of claim 20, wherein the first function block includes a set of instructions that perform the process function, wherein the indicated point is associated with one of the set of instructions and wherein the controlling means of the trace-tune function block stops operation of the first function block when the first function block reaches the indicated one of the set of instructions.

23. The device of claim 20, wherein the trace-tune function block includes means responsive to a user for restarting execution of the process control scheme at the indicated point.

24. The device of claim 20, wherein the trace-tune function block includes means for communicating process data from the process control device via the bus when the execution of the process control scheme is interrupted.

25. The device of claim 20, wherein the trace-tune function block further includes means for indicating a condition that must be satisfied at the indicated point, means for determining if the condition is satisfied at the indicated point and means for stopping execution of the process control scheme when the condition is satisfied at the indicated point.

26. The device of claim 20, wherein the trace-tune function block includes means for changing the mode of the first function block when the process control scheme reaches the indicated point.

27. The device of claim 20, wherein the trace-tune function block includes means for storing data associated with a process parameter during operation of the process control scheme and means for communicating the stored data via the bus when the process control scheme reaches the indicated point.

28. The device of claim 20, wherein the trace-tune function block includes means for communicating process data from the first function block via the bus when the process control scheme reaches the indicated point.

* * * * *